(12) United States Patent
Yip et al.

(10) Patent No.: US 12,386,991 B2
(45) Date of Patent: Aug. 12, 2025

(54) SYSTEMS AND METHODS FOR AUTOMATED DISCOVERY AND ANALYSIS OF PRIVILEGED ACCESS ACROSS MULTIPLE COMPUTING PLATFORMS

(71) Applicant: Ernst & Young U.S. LLP, New York, NY (US)

(72) Inventors: Vincent Yip, Hoboken, NJ (US); Kaushal Joshi, West Orange, NJ (US); Marek Gibiec, Chicago, IL (US); Abhishek Madhok, Montclair, NJ (US); Syed Muhammad Raza Zaidi, Chicago, IL (US); Fahad Abunayyan, Fairfax, VA (US); Chris Lanzilotta, Havre de Grace, MD (US); Divye Chaturvedi, Meerut (IN); Yashika Manav, New Delhi (IN)

(73) Assignee: Ernst & Young U.S. LLP, New York, NY (US)

( * ) Notice: Subject to any disclaimer, the term of this patent is extended or adjusted under 35 U.S.C. 154(b) by 171 days.

(21) Appl. No.: 18/164,377

(22) Filed: Feb. 3, 2023

(65) Prior Publication Data
US 2023/0259647 A1 Aug. 17, 2023

Related U.S. Application Data

(60) Provisional application No. 63/306,623, filed on Feb. 4, 2022.

(51) Int. Cl.
*G06F 21/62* (2013.01)
*G06F 16/23* (2019.01)
*G06F 21/60* (2013.01)

(52) U.S. Cl.
CPC ...... *G06F 21/6218* (2013.01); *G06F 16/2379* (2019.01); *G06F 21/604* (2013.01)

(58) Field of Classification Search
CPC ............ G06F 21/6218; G06F 16/2379; G06F 21/604; G06F 2221/2101; H04L 63/102; H04L 63/104; H04L 63/105; H04L 63/20
See application file for complete search history.

(56) References Cited

U.S. PATENT DOCUMENTS 9,632,823 B1 * 4/2017 Allen ................. G06F 11/3452
10,116,658 B2 10/2018 Sade et al.
(Continued)

FOREIGN PATENT DOCUMENTS

WO WO-2023150567 A1 8/2023

OTHER PUBLICATIONS

International Search Report and Written Opinion for International Application No. PCT/US2023/061771 dated May 19, 2023, 12 Pages.

(Continued)

*Primary Examiner* — Henry Tsang
(74) *Attorney, Agent, or Firm* — COOLEY LLP

(57) ABSTRACT

In some embodiments, a method includes retrieving data associated with each account from a set of accounts from one or more computing platforms and parsing the data to determine a set of characteristics associated with each account from the set of accounts. The method includes mapping, based on an entitlement value of each account, a first subset of accounts from the set of accounts to a first privilege value, and mapping, based on an entitlement value of each account, a second subset of accounts from the set of accounts to a second privilege value. The method includes generating a report indicating the first subset of accounts having the first privilege value and the second subset of accounts having the second privilege value. In some imple- (Continued)

mentations, the method includes scheduling a set of jobs to execute the jobs automatically in response to at least one trigger event.

19 Claims, 33 Drawing Sheets

(56) References Cited

U.S. PATENT DOCUMENTS

| | | | |
|---|---|---|---|
| 10,609,038 | B2 | 3/2020 | Hecht |
| 10,754,506 | B1 * | 8/2020 | Moyal ................ G06F 3/04842 |
| 2009/0150981 | A1 | 6/2009 | Amies et al. |
| 2018/0039666 | A1 * | 2/2018 | Giuca ................... G06F 16/245 |
| 2020/0329066 | A1 * | 10/2020 | Kirti ................... H04L 63/1416 |
| 2020/0396312 | A1 * | 12/2020 | Anderson, III ....... H04L 63/102 |

OTHER PUBLICATIONS

Cyberark, "Discovery and Audit (DNA)," product description, published Dec. 1, 2019, 4 pages, accessed online Apr. 26, 2023, at <https://docs.cyberark.com/Product-Doc/OnlineHelp/PAS/11.1/en/Content/MESSAGES/Discovery-and-Audit-DNA.htm>.

International Preliminary Report on Patentability for International Application No. PCT/US2023/061771, by Ernst & Young U.S. LLP, mailed Aug. 15, 2024; 7 pages.

* cited by examiner

FIG. 6A (cont.)

jobs
- id
- entry_id
- job_name
- job_group
- job_start_time
- job_end_time
- next_fire_time
- trigger_name
- trigger_group
- schedule_type
- job_status
- job_result

QRTZ_CRON_TRIGGERS
- SCHED_NAME
- TRIGGER_NAME
- TRIGGER_GROUP
- CRON_EXPRESSION

QRTZ_FIRED_TRIGGERS
- SCHED_NAME
- ENTRY_ID
- TRIGGER_NAME
- TRIGGER_GROUP
- INSTANCE_NAME
- FIRED_TIME
- SCHED_TIME
- PRIORITY
- STATE
- JOB_NAME
- JOB_GROUP
- IS_NONCONCURRENT
- REQUESTS_RECOVERY

QRTZ_SCHEDULER_STATE
- SCHED_NAME
- INSTANCE_NAME
- LAST_CHECKIN_TIME

QRTZ_LOCKS
- SCHED_NAME

QRTZ_PAUSED_TRIGGER_GRPS
- SCHED_NAME
- TRIGGER_GROUP

FIG. 6B data_correlation
- id
- correlation_rule_name
- correlation_rule_description
- correlation_rule_type
- is_enabled
- precedence
- platform_name
- source_table
- source_table_alias
- target_table
- target_table_alias
- set_condition
- join_condition
- where_condition config
- [Key]
- Value
- Category
- Type report
- report_id
- report_name
- report_description platform
- name user
- user_id
- user_name
- user_cred user_log
- id
- username
- last_login_time
- logout_time
- authentication_type
- domain
- ip_address
- action
- exception
- message

FIG. 6B (cont.)

app_metadata
- id
- name
- value
- metadata_type
- data_type app_log
- id
- date
- thread
- [level]
- logger
- message email
- id
- name
- subject data_source
- id
- source_name
- source_type
- connector_type
- platform_name
- username
- password
- address
- port
- instance_name
- pam_use_A2A
- pam_solution
- pam_unique_id
- uniqueidentifier
- updateidentifier
- load_option
- max_numberof_threads
- connector_attributes
- pam_apt_url
- scan_system_filter_id
- retire_system_filter_id rule
- id
- name
- description
- precedence
- platform_name
- set_table_name
- set_column_name
- set_column_value
- set_ceival_expression
- type
- use_smart_query

FIG. 6B (cont.)

email_field
- id
- name
- description
- query schema_mapping
- id
- platform_name
- source_type
- data_source_name
- display_name
- source_column
- destination_column
- source_column_type
- source_column_dateformat criterion
- id
- rule_id
- logical_operator
- table_name
- open_parenthesis
- column_name
- close_parenthesis
- comparison_operator
- column_value
- case_sensitive
- precedence
- smart_query

FIG. 7A

| | id | name | description |
|---|---|---|---|
| 1 | 4 | MSSQL_PrivilegedRoles | MSSQL_PrivilegedRoles |
| 2 | 6 | ActiveDirectory_Privileged_Groups | Active Directory Privileged Groups |
| 3 | 10 | ActiveDirectory_PrivilegedTier_High_Groups | ActiveDirectory_PrivilegedTier_High_Groups |
| 4 | 11 | ActiveDirectory_PrivilegedTier_Medium_Groups | ActiveDirectory_PrivilegedTier_Medium_Groups |
| 5 | 12 | ActiveDirectory_PrivilegedTier_Low_Groups | ActiveDirectory_PrivilegedTier_Low_Groups |
| 6 | 13 | MSSQL_PrivilegedTier_High_Roles | MSSQL_PrivilegedTier_High_Roles |
| 7 | 14 | MSSQL_PrivilegedTier_Medium_Roles | MSSQL_PrivilegedTier_Medium_Roles |
| 8 | 16 | WindowsServer_PrivilegedTier_High_Groups | WindowsServer_PrivilegedTier_High_Groups |
| 9 | 17 | OracleDatabase_Privileged_Entitlements | OracleDatabase_Privileged_Entitlements |
| 10 | 18 | OracleDatabase_PrivilegedTier_High_Entitlements | OracleDatabase_PrivilegedTier_High_Entitlements |
| 11 | 19 | OracleDatabase_PrivilegedTier_Medium_Entitlements | OracleDatabase_PrivilegedTier_Medium_Entitlements |
| 12 | 20 | OracleDatabase_PrivilegedTier_Low_Entitlements | OracleDatabase_PrivilegedTier_Low_Entitlements |
| 13 | 21 | MSSQL_PrivilegedTier_Low_Roles | MSSQL_PrivilegedTier_Low_Roles |
| 14 | 22 | OracleDatabase_Privileged_OSEntitlements | OracleDatabase_Privileged_OSEntitlements |
| 15 | 24 | OracleDatabase_PrivilegedTier_High_OSEntitlements | OracleDatabase_PrivilegedTier_High_OSEntitlements |
| 16 | 25 | ActiveDirectory_Privileged_BuiltinAccounts | ActiveDirectory_Privileged_BuiltinAccounts |
| 17 | 26 | ActiveDirectory_PrivilegedTier_BuiltinAccounts | ActiveDirectory_PrivilegedTier_BuiltinAccounts |
| 18 | 27 | ActiveDirectory_Human_Accounts | Set account as human based on defined logic |
| 19 | 28 | OracleDatabase_Builtin_Accounts | List of built-in and system accounts in Oracle Databa... |
| 20 | 29 | MSSQL_Builtin_Accounts | List of built-in and system accounts in Microsoft SQL... |
| 21 | 30 | WindowsAD_Builtin_Accounts | List of built-in and system accounts on Windows serv... |
| 22 | 31 | WindowsServer_Privileged_BuiltinAccounts | WindowsServer_Privileged_BuiltinAccounts |
| 23 | 32 | WindowsServer_PrivilegedTier_High_BuiltinAccounts | WindowsServer_PrivilegedTier_High_BuiltinAccounts |
| 24 | 33 | LinuxServer_Builtin_Accounts | Linux Server Builtin Accounts list |
| 25 | 34 | LinuxServer_Human_Accounts | LinuxServer human or user accounts using default h... |
| 26 | 48 | Default_ScanSystemFilter | Default filter to get a list of systems from system tabl... |
| 27 | 49 | Default_RetireSystemFilter | Default filter to get a list of systems from system tabl... |
| 28 | 50 | OracleDatabase_PrivilegedGroup_Entitlements | OracleDatabase_PrivilegedGroup_Entitlements |
| 29 | 60 | LinuxServer_Privileged_entitlement | LinuxServer_Privileged_entitlement |
| 30 | 68 | UpdatePasswordAgeInDays | UpdatePasswordAgeInDays |
| 31 | 1... | WindowsServer_Privileged_Groups | WindowsServer_Privileged_Groups |
| 32 | 2... | MySqlDatabase_Privileged_Entitlement | MySqlDatabase_Privileged_Entitlement |

Table continues to FIG.7B

FIG. 7B

Table starts from FIG.7A

| precedence | platform_name | set_table_name | set_column_name | set_column_value | set_colval_expression | type | use_smart_query |
|---|---|---|---|---|---|---|---|
| 1 | Microsoft SQL Server | entitlement | is_privileged | 1 | 0 | Privileged | 0 |
| 10 | Active Directory | group | is_privileged | 1 | 0 | Privileged | 0 |
| 10 | Active Directory | group | privileged_tier | High | 0 | PrivilegedTier | 0 |
| 5 | Active Directory | group | privileged_tier | Medium | 0 | PrivilegedTier | 0 |
| 2 | Active Directory | group | privileged_tier | Low | 0 | PrivilegedTier | 0 |
| 9 | Microsoft SQL Server | entitlement | privileged_tier | High | 0 | PrivilegedTier | 0 |
| 4 | Microsoft SQL Server | entitlement | privileged_tier | Medium | 0 | PrivilegedTier | 0 |
| 8 | Windows Server | group | privileged_tier | High | 0 | PrivilegedTier | 0 |
| 1 | Oracle Database | entitlement | is_privileged | 1 | 0 | Privileged | 0 |
| 9 | Oracle Database | entitlement | privileged_tier | High | 0 | PrivilegedTier | 0 |
| 4 | Oracle Database | entitlement | privileged_tier | Medium | 0 | PrivilegedTier | 0 |
| 1 | Oracle Database | entitlement | privileged_tier | Low | 0 | PrivilegedTier | 0 |
| 1 | Microsoft SQL Server | entitlement | privileged_tier | Low | 0 | PrivilegedTier | 0 |
| 1 | Windows Server | group | is_privileged | 1 | 0 | Privileged | 0 |
| 9 | Windows Server | group | privileged_tier | High | 0 | PrivilegedTier | 0 |
| 1 | Active Directory | account | is_privileged | 1 | 0 | Privileged | 0 |
| 10 | Active Directory | account | privileged_tier | High | 0 | PrivilegedTier | 0 |

| | | | | | |
|---|---|---|---|---|---|
| 1 | | account | | account_type | Human | 0 | Standard | 0 |
| 1 | | account | | account_type | Built-in | 0 | Standard | 0 |
| 1 | | account | | account_type | Built-in | 0 | Standard | 0 |
| 1 | | account | | account_type | Built-in | 0 | Standard | 0 |
| 1 | Windows Server | account | is_privileged | 1 | 0 | Privileged | 0 |
| 8 | Windows Server | account | privileged_tier | High | 0 | PrivilegedTier | 0 |
| 2 | Linux Server | account | account_type | Built-in | 0 | Standard | 0 |
| 1 | | account | | account_type | Human | 0 | Standard | 0 |
| 0 | | | | | | 0 | ScanSyste... | 0 |
| 0 | | | | | | 0 | RetireSyst... | 0 |
| 1 | Oracle Database | entitlement | is_privileged | 1 | 0 | PrivilegedG... | 0 |
| 1 | Linux Server | entitlement | is_privileged | 1 | 0 | Privileged | 0 |
| 1 | | account | CustomAttribute... | DATEDIFF(day... | 1 | Standard | 0 |
| 1 | Windows Server | group | is_privileged | 1 | 0 | Privileged | 0 |
| 1 | MySQL Database | entitlement | is_privileged | 1 | 0 | Privileged | 0 |

Table continues from FIG.7B

FIG. 7B (cont.)

```
namespace Paris.Connector
{
    public class <CONNECTOR_CLASS_NAME>
    {
        public static int ExecuteConnector(List<schema_mapping> schemaMapList, string jobID, data_source dataSource)
        {
            try
            {
                if (dataSource.source_type.Equals("account"))
                {
                }
                else if (dataSource.source_type.Equals("group"))
                {
                }
                else if (dataSource.source_type.Equals("entitlement"))
                {
                }
                else if (dataSource.source_type.Equals("membership"))
                {
                }
                else if (dataSource.source_type.Equals("secret"))
                {
                }
            }
            catch (Exception exception)
            {
            }
            return returnStatus;
        }
    }
}
```

| | source_name | source_type | connector_type | platform_name |
|---|---|---|---|---|
| 1 | Active Directory ETLab-account | account | Paris.Connector.ActiveDirectory | Active Directory |
| 2 | Active Directory ETLab-entitlement | entitlement | Paris.Connector.ActiveDirectory | Active Directory |
| 3 | Active Directory ETLab-groups | group | Paris.Connector.ActiveDirectory | Active Directory |
| 4 | Active Directory ETLab-membership | membership | Paris.Connector.ActiveDirectory | Active Directory |
| 5 | API_AzureGraph-GetDirectoryRoles | entitlement | Paris.Connector.RestApi | Microsoft Azure |
| 6 | API_AzureGraph-GetDirectoryRolesMembers | membership | Paris.Connector.RestApi | Microsoft Azure |
| 7 | API_AzureGraph-GetGroups | group | Paris.Connector.RestApi | Microsoft Azure |
| 8 | API_AzureGraph-GetGroupsMembers | membership | Paris.Connector.RestApi | Microsoft Azure |
| 9 | API_AzureGraph-GetServicePrincipals | account | Paris.Connector.RestApi | Microsoft Azure |
| 10 | API_AzureGraph-GetUsers | account | Paris.Connector.RestApi | Microsoft Azure |
| 11 | API_AzureManagement-GetManagementGroups | system | Paris.Connector.RestApi | Microsoft Azure Subscriptions |
| 12 | API_AzureManagement-GetMGRoleAssignments | membership | Paris.Connector.RestApi | Microsoft Azure Subscriptions |
| 13 | API_AzureManagement-GetRoleDefinitions | entitlement | Paris.Connector.RestApi | Microsoft Azure Subscriptions |
| 14 | API_AzureManagement-GetRootManagementGroup | system | Paris.Connector.RestApi | Microsoft Azure Subscriptions |
| 15 | API_AzureManagement-GetSubRoleAssignments | membership | Paris.Connector.RestApi | Microsoft Azure Subscriptions |
| 16 | API_AzureManagement-GetSubscriptions | system | Paris.Connector.RestApi | Microsoft Azure Subscriptions |
| 17 | API_CyberArk-GetAccountsUsingSafeNames | account | Paris.Connector.RestApi | CyberArk PAS |
| 18 | API_CyberArk-GetSafeMembers | membership | Paris.Connector.RestApi | CyberArk PAS |
| 19 | API_CyberArk-GetSafePermissions | entitlement | Paris.Connector.RestApi | CyberArk PAS |
| 20 | API_CyberArk-GetSafes | system | Paris.Connector.RestApi | CyberArk PAS |
| 21 | Database-Oracle-Accounts | account | Paris.Connector.OracleDatabase | Oracle Database |
| 22 | Database-Oracle-Entitlements | entitlement | Paris.Connector.OracleDatabase | Oracle Database |
| 23 | Database-Oracle-Memberships | membership | Paris.Connector.OracleDatabase | Oracle Database |
| 24 | Database-SQLServer-Accounts | account | Paris.Connector.MicrosoftSQL... | Microsoft SQL Server |
| 25 | Database-SQLServer-Entitlements | entitlement | Paris.Connector.MicrosoftSQL... | Microsoft SQL Server |
| 26 | Database-SQLServer-Memberships | membership | Paris.Connector.MicrosoftSQL... | Microsoft SQL Server |
| 27 | Domain Windows Servers-ET-LAB-Account | account | Paris.Connector.WindowsServer | Windows Server |
| 28 | Domain Windows Servers-ET-LAB-Entitlement | entitlement | Paris.Connector.WindowsServer | Windows Server |
| 29 | Domain Windows Servers-ET-LAB-Group | group | Paris.Connector.WindowsServer | Windows Server |
| 30 | Domain Windows Servers-ET-LAB-Membership | membership | Paris.Connector.WindowsServer | Windows Server |
| 31 | LinuxServer-Account | account | Paris.Connector.SSH_LinuxSer... | Linux Server |
| 32 | LinuxServer-Entitlement | entitlement | Paris.Connector.SSH_LinuxSer... | Linux Server |
| 33 | LinuxServer-Group | group | Paris.Connector.SSH_LinuxSer... | Linux Server |
| 34 | LinuxServer-Membership | membership | Paris.Connector.SSH_LinuxSer... | Linux Server |
| 35 | LinuxServer-Secret | secret | Paris.Connector.SSH_LinuxSer... | Linux Server |
| 36 | MySQL-Database-Account | account | Paris.Connector.MySqlDB | MySQL Database |
| 37 | MySQL-Database-Entitlement | entitlement | Paris.Connector.MySqlDB | MySQL Database |
| 38 | MySQL-Database-Membership | membership | Paris.Connector.MySqlDB | MySQL Database |
| 39 | NetworkScan-NixServers | system | Paris.Connector.SSHNetworkS... | NIX Server Scanner |
| 40 | NetworkScan-WindowsServers | system | Paris.Connector.WindowsNetw... | Windows Server Scanner |
| 41 | OpenDJ Directory-Accounts | account | Paris.Connector.LDAP | LDAP Directory - OpenDJ |
| 42 | OpenDJ Directory-Groups | group | Paris.Connector.LDAP | LDAP Directory - OpenDJ |
| 43 | OpenDJ Directory-Memberships | membership | Paris.Connector.LDAP | LDAP Directory - OpenDJ |
| 44 | System-TrustedAuthoritativeSource_CSV | system | Paris.Connector.FlatFile_CSV | System-Source Of Truth |

Table continues to FIG. 9B

FIG. 9B

Table starts from FIG. 9A

| username | password | address | port | instance_name | pam_use_A2A | pam_solution | pam_unique_id | unique_identifier | updateIdentifier |
|---|---|---|---|---|---|---|---|---|---|
| NULL | NULL | NULL | 389 | NULL | NULL | NULL | NULL | CustomAttribute6 | NULL |
| NULL | NULL | NULL | 389 | NULL | NULL | NULL | NULL | entitlement_name | NULL |
| NULL | NULL | NULL | 389 | NULL | NULL | NULL | NULL | CustomAttribute1 | NULL |
| NULL | NULL | NULL | 389 | NULL | NULL | NULL | NULL | system_name,group_name,memberOf,system_name,acct... | NULL |
| NULL | NULL | NULL | NULL | NULL | NULL | NULL | NULL | system_name,entitlement_name | NULL |
| NULL | NULL | NULL | NULL | NULL | NULL | NULL | NULL | system_name,acct_name,memberOf | NULL |
| NULL | NULL | NULL | NULL | NULL | NULL | NULL | NULL | system_name,group_name, | NULL |
| NULL | NULL | NULL | NULL | NULL | NULL | NULL | NULL | system_name,acct_name,memberOf | NULL |
| NULL | NULL | NULL | NULL | NULL | NULL | NULL | NULL | system_name,acct_name | NULL |
| NULL | NULL | NULL | NULL | NULL | NULL | NULL | NULL | system_name,acct_name | NULL |
| NULL | NULL | NULL | NULL | NULL | NULL | NULL | NULL | system_name,application_name | NULL |
| NULL | NULL | NULL | NULL | application_name | NULL | NULL | NULL | system_name,application_name,acct_name,memberOfsy... | NULL |
| NULL | NULL | NULL | NULL | NULL | NULL | NULL | NULL | system_name,application_name,entitlement_name | NULL |
| NULL | NULL | NULL | NULL | application_name | NULL | NULL | NULL | system_name,application_name | NULL |
| NULL | NULL | NULL | NULL | NULL | NULL | NULL | NULL | system_name,application_name,acct_name,memberOfsy... | NULL |
| NULL | NULL | NULL | NULL | application_name | NULL | NULL | NULL | system_name,application_name | NULL |
| NULL | NULL | NULL | NULL | NULL | NULL | NULL | NULL | system_name,application_name,acct_name,memberOf | NULL |
| NULL | NULL | NULL | NULL | NULL | NULL | NULL | NULL | system_name,application_name,entitlement_name | NULL |
| NULL | NULL | NULL | port | application_name | NULL | NULL | NULL | system_name,application_name,acct_name | NULL |
| NULL | NULL | NULL | port | application_name | NULL | NULL | NULL | system_name,application_name,entitlement_name | NULL |

| | | | | | | |
|---|---|---|---|---|---|---|
| NULL | NULL | NULL | application_name | NULL | NULL | system_name,application_name,entitlement_name,membe... | NULL |
| NULL | NULL | port | application_name | NULL | NULL | system_name,application_name,acct_name | NULL |
| NULL | NULL | port | application_name | NULL | NULL | system_name,application_name,entitlement_name | NULL |
| NULL | NULL | port | application_name | NULL | NULL | system_name,application_name,group_name,memberOfs... | NULL |
| NULL | NULL | NULL | NULL | NULL | NULL | system_name,acct_name | NULL |
| NULL | NULL | NULL | NULL | NULL | NULL | system_name,entitlement_name | NULL |
| NULL | NULL | NULL | NULL | NULL | NULL | system_name,group_name | NULL |
| NULL | NULL | 22 | NULL | NULL | NULL | system_name,group_name,memberOf,system_name,acct... | NULL |
| NULL | NULL | 22 | NULL | NULL | NULL | system_name,acct_name,CustomAttribute12 | system_nam... |
| NULL | NULL | 22 | NULL | NULL | NULL | system_name,acct_name,entitlement_type,parent_... | NULL |
| NULL | NULL | 22 | NULL | NULL | NULL | system_name,group_name,CustomAttribute5 | NULL |
| NULL | NULL | 22 | NULL | NULL | NULL | system_name,group_name,memberOf,system_name,acct... | NULL |
| NULL | NULL | 22 | NULL | NULL | NULL | system_name,acct_name,secret_name,CustomAttribute3 | NULL |
| NULL | NULL | port | NULL | NULL | NULL | system_name,acct_name | NULL |
| NULL | NULL | port | NULL | NULL | NULL | system_name,entitlement_name | NULL |
| NULL | NULL | port | NULL | NULL | NULL | system_name,acct_name,memberOf | NULL |
| NULL | NULL | 22 | NULL | NULL | NULL | system_name,application_name,fqdn,CustomAttribute1,sy... | NULL |
| NULL | NULL | 389 | NULL | NULL | NULL | system_name,application_name,fqdn,CustomAttribute1,sy... | NULL |
| NULL | NULL | 389 | NULL | NULL | NULL | system_name,acct_name | NULL |
| NULL | NULL | 389 | NULL | NULL | NULL | system_name,group_name | NULL |
| NULL | NULL | 389 | NULL | NULL | NULL | system_name,group_name,memberOf,system_name,acct... | NULL |
| NULL | NULL | NULL | NULL | NULL | NULL | system_name,application_name,system_type | NULL |

FIG. 9B (cont.)

Table continues from FIG. 9B

FIG. 10A (cont.)

Non-Compliant Human Accounts by Risk Level — 1004

| Platform Name | High | Medium | Low | Total |
|---|---|---|---|---|
| Active Directory | 55 | 0 | 0 | 346 |
| Microsoft SQL Server | 98 | 0 | 0 | 98 |
| Windows Server | 98 | 0 | 0 | 98 |
| Total | 108 | 0 | 0 | 399 |

Non-Compliant Non-Human Accounts by Risk Level — 1005

| Platform Name | High | Medium | Low | Total |
|---|---|---|---|---|
| Active Directory | 15 | 0 | 0 | 95 |
| Windows Server | 41 | 0 | 0 | 56 |
| Microsoft SQL Server | 16 | 0 | 0 | 16 |
| Total | 61 | 0 | 0 | 156 |

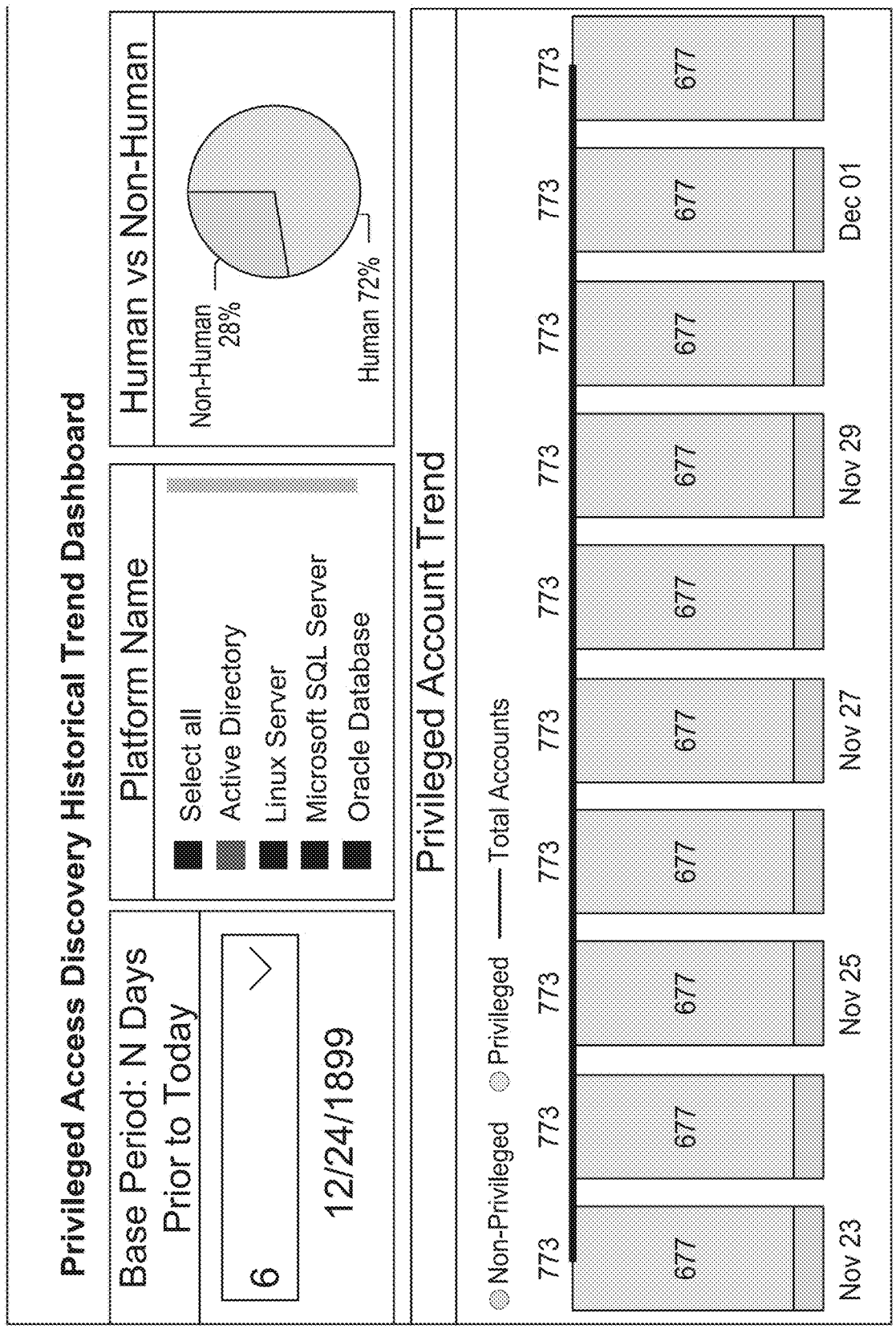

FIG. 10B (cont.)

Account Details

| System | Account Name | Account Type | Privilege | Compliance | Privileged Tier | Password Age |
|---|---|---|---|---|---|---|
| ETLABVMLCY BCM2 | 'bob'@'%' | Non-Human | Privileged | Compliance | | 41 |
| etlabvmlcyba pp1.et.lab | CATdemo1 | Non-Human | Privileged | Compliance | High | 41 |
| 10.254.36.186 | 'developer'@'%' | Non-Human | Privileged | Compliance | | 50 |
| ETLABVMLCY BCM2 | 'developer'@'%' | Non-Human | Privileged | Compliance | | 50 |
| et.lab | gordojlab-5 | Non-Human | Privileged | Compliance | High | 41 |
| ETLABVMLCY BCM2 | 'james'@'%' | Non-Human | Privileged | Compliance | | 41 |
| ETLABVMLCY | 'john'@'%' | Non-Human | Privileged | Compliance | | 41 |

FIG. 10C

| id | Platform_Name | System_Name | Account_Name | Account_Type |
|---|---|---|---|---|
| 120 | Active Directory | et.lab | L.CPADAUS0365.03 | Non-Human |
| 119 | Active Directory | et.lab | L.CPADAUS0356.02 | Non-Human |
| 118 | Active Directory | et.lab | L.CPADAUS0356.01 | Non-Human |
|  | Active Directory | et.lab |  |  |
| 382 | Active Directory | et.lab | L1099162 | Human |
| 903 | Active Directory | et.lab | L16090214 | Human |
| 826 | Active Directory | et.lab | L1257176 | Human |
| 373 | Active Directory | et.lab | L1075978 | Human |
| 1406 | Active Directory | et.lab | L2356922 | Human |
| 1595 | Active Directory | et.lab | L5018771 | Human |
|  | Active Directory | et.lab |  |  |
|  | Active Directory | et.lab |  |  |

FIG. 10C (cont.)

| Interactive Logon | Group_Name | Distinguished_Name | Privileged_Group |
|---|---|---|---|
| Yes | | CN=L.CPADAUS0365.03,O | CN=ADM-CheckPointAD |
| Yes | | CN=L.CPADAUS0356.02,O | CN=ADM-CheckPointAD |
| Yes | | CN=L.CPADAUS0356.01,O | CN=ADM- |
| No | IT-NETDNSAdn | CN=IT-NET DNS Admin-T | |
| No | | CN=L109916 | |
| No | | | DNS AdminsE |
| No | | | CN=ADM-DNS AdminsE |
| No | | CN=L1075978 Keith Dering,O | CN=ADM-DNS AdminsE |
| No | | CN=L2356922 Zahad Syed | CN=ADM-DNS AdminsE |
| No | | CN=L5018771 Jerry Nwos | CN=ADM-DNS AdminsE |
| No | Enterprise Adm | CN=Enterprise Admins, CN | CN=Administrators,CN=E |
| No | IT-LAB-Admin | CN=IT-LAB-Admin,OU= | CN=Administrators,CN=E |
| No | Domain Admins | CN=Domain Admins,CN= | CN=Administrators,CN=E |

FIG. 10C (cont.)

| id | Platform_Name | System_Name | Instance_Name | Account_Name | Domain or Local |
|---|---|---|---|---|---|
| 1695 | Active Directory | et.lab | | | |
| 60 | Active Directory | et.lab | | | |
| 61 | Active Directory | LouisGlab-5 | | | Yes (Non-Human) |
| 10 | Active Directory | isadmin | | | Yes (Built-in) |
| 51938 | Microsoft SQL Server | ETLABVMLCYBSQL1 | MISSQLSERVER | ETETLABVMLCY | Local |
| 51942 | Microsoft SQL Server | ETLABVMLCYBSQL1 | MISSQLSERVER | ETLABVMLCYBS | Local |
| 51944 | Microsoft SQL Server | ETLABVMLCYBSQL1 | MISSQLSERVER | NT ServiceMSS | Local |
| 51946 | Microsoft SQL Server | ETLABVMLCYBSQL1 | MISSQLSERVER | NT SERVICESQL | Local |
| 51947 | Microsoft SQL Server | ETLABVMLCYBSQL1 | MISSQLSERVER | NT SERVICESQL | Local |
| 51948 | Microsoft SQL Server | ETLABVMLCYBSQL1 | MISSQLSERVER | NT SERVICEWin | Local |
| 51949 | Microsoft SQL Server | ETLABVMLCYBSQL1 | MISSQLSERVER | sa | Local |
| 1720 | Active Directory | et.lab | MISSQLSERVER | | |
| 118 | Active Directory | et.lab | MISSQLSERVER | | |
| 157 | Active Directory | et.lab | MISSQLSERVER | | |
| 1692 | Active Directory | et.lab | MISSQLSERVER | | |
| 157 | Active Directory | et.lab | MISSQLSERVER | | |
| 1697 | Active Directory | et.lab | MISSQLSERVER | | |
| 118 | Active Directory | et.lab | MISSQLSERVER | | |
| 11 | Active Directory | et.lab | MISSQLSERVER | | |
| 313 | Active Directory | et.lab | MISSQLSERVER | | |
| 51855 | Microsoft SQL Server | ETLABVMLCYBSQL2 | MISSQLSERVER | NT ServiceM | |
| 51857 | Microsoft SQL Server | ETLABVMLCYBSQL2 | MISSQLSERVER | NT SERVICESQL | Local |
| 51859 | Microsoft SQL Server | ETLABVMLCYBSQL2 | MISSQLSERVER | NT SERVICESQL | Local |
| 51860 | Microsoft SQL Server | ETLABVMLCYBSQL2 | MISSQLSERVER | NT SERVICEWin | Local |
| 51861 | Microsoft SQL Server | ETLABVMLCYBSQL2 | MISSQLSERVER | sa | Local |
| 51869 | Microsoft SQL Server | ETLABVMLCYBSQL2 | MISSQLSERVER | hmailserver | Local |

FIG. 10C (cont.)

| Account_Type | Group_Name | Distinguished_Name | Privileged_Name | Privileged_Group | Privileged_Group_Plat | Privileged_Group_Sys | | |
|---|---|---|---|---|---|---|---|---|
| | | CN=LouisG lab-5,OU=Dom | | | | | 1 | High |
| | | CN=isadmin,CN=Users,D | CN=Administrators,CN=E | | | | 1 | High |
| Non-Human | | | sysadmin | Microsoft SQL Server | ETLABVMLCYBSQL1 | FALSE | | |
| Non-Human | | | sysadmin | Microsoft SQL S | ABVMLCYBSQL1 | FALSE | | |
| Built-in | | | sysadmin | Mic | BVMLCYBSQL1 | | | |
| Built-in | | | sysadmin | | ETLABVMLCYBSQL1 | | | |
| Built-in | | | | QL Server | ETLABVMLCYBSQL1 | | | |
| Built-in | IT-Cyb | | min | Microsoft SQL Server | ETLABVMLCYBSQL1 | | | |
| | -CyberRisk_Team | CN=IT-LAB-Admin,OU- | eam sysadmin | Microsoft SQL Server | ETLABVMLCYBSQL1 | | | |
| | PR-PIDA_Admin | CN=IT-CyberRisk-Team | sysadmin | Microsoft SQL Server | ETLABVMLCYBSQL2 | | | |
| | | CN=PR-PIDA_Admin,C | sysadmin | Microsoft SQL Server | ETLABVMLCYBSQL2 | | | |
| Built-in | | | sysadmin | Microsoft SQL Server | ETLABVMLCYBSQL2 | | | |
| Built-in | | | sysadmin | Microsoft SQL Server | ETLABVMLCYBSQL2 | | | |
| Built-in | | | sysadmin | Microsoft SQL Server | ETLABVMLCYBSQL2 | | | |
| Built-in | | | sysadmin | Microsoft SQL Server | ETLABVMLCYBSQL2 | | | |
| Non-Human | | | sysadmin | Microsoft SQL Server | ETLABVMLCYBSQL2 | | | |

FIG. 10C (cont.)

| | | Privileged | is_privileged | privileged_tier | is_disable | ge_in_Days | Password_A |
|---|---|---|---|---|---|---|---|
| FALSE | 248 | MSSQLSER | 1 | High | FALSE | | |
| FALSE | 834 | MSSQLSER | 1 | High | FALSE | | |
| | | MSSQLSER | 1 | High | FALSE | | |
| | | MSSQLSER | 1 | High | FALSE | | |
| | | MSSQLSER | 1 | High | FALSE | | |
| | | MSSQLSER | 1 | High | FALSE | | |
| | | MSSQLSER | 1 | High | FALSE | 1130 | |
| | | MSSQLSER | 1 | High | FALSE | | |
| | | MSSQLSER | 1 | High | | | |
| | | MSSQLSER | 1 | High | | | |
| | | MSSQLSER | 1 | High | | | |
| | | MSSQLSER | 1 | High | FALSE | | |
| | | MSSQLSER | 1 | High | FALSE | | |
| | | MSSQLSER | 1 | High | FALSE | | |
| | | MSSQLSER | 1 | High | FALSE | 66 | |
| | | MSSQLSER | 1 | High | FALSE | 44042 | |

SYSTEMS AND METHODS FOR AUTOMATED DISCOVERY AND ANALYSIS OF PRIVILEGED ACCESS ACROSS MULTIPLE COMPUTING PLATFORMS

CROSS-REFERENCE TO RELATED APPLICATIONS

This application is a non-provisional of and claims benefit of U.S. Patent Application No. 63/306,623, filed Feb. 4, 2022, the disclosure of which is hereby incorporated by reference.

BACKGROUND

Embodiments described herein relate to systems and methods for monitoring and analyzing privileged accesses to sensitive computer systems and devices. Specifically, but not by way of limitation, some embodiments described herein relate to systems and methods for automated privileged-access discovery and analysis across multiple information technology platforms.

Some organizations have thousands of computers and servers running various versions of operating systems and computing platforms (e.g., Unix®, Linux®, Windows®) on their network. These organizations commonly run different business applications on different computing platforms that interact with each other and transmit data and files to/from each other. In some situations, these organizations use authentication mechanisms to grant authorizations and access rights to individual users to access digital resources. A user can be given authorization to log into certain accounts based on the user's role. Users can have different levels of access rights to different digital resources.

Accordingly, a need exists for a system and a method to provide automated discovery and analysis of privileged access across multiple computing platforms.

BRIEF DESCRIPTION OF THE FIGURES

FIGS. 6A-6B show an example database design and schema, according to some embodiments.

FIGS. 7A-7B show an example library of the privileged rules and criteria, according to some embodiments.

FIG. 8 shows example code of the connector framework/engine to connect to various computing platforms, according to some embodiments.

FIGS. 9A-9B show an example library of the retrieved data, according to some embodiments.

SUMMARY

Figure 1:
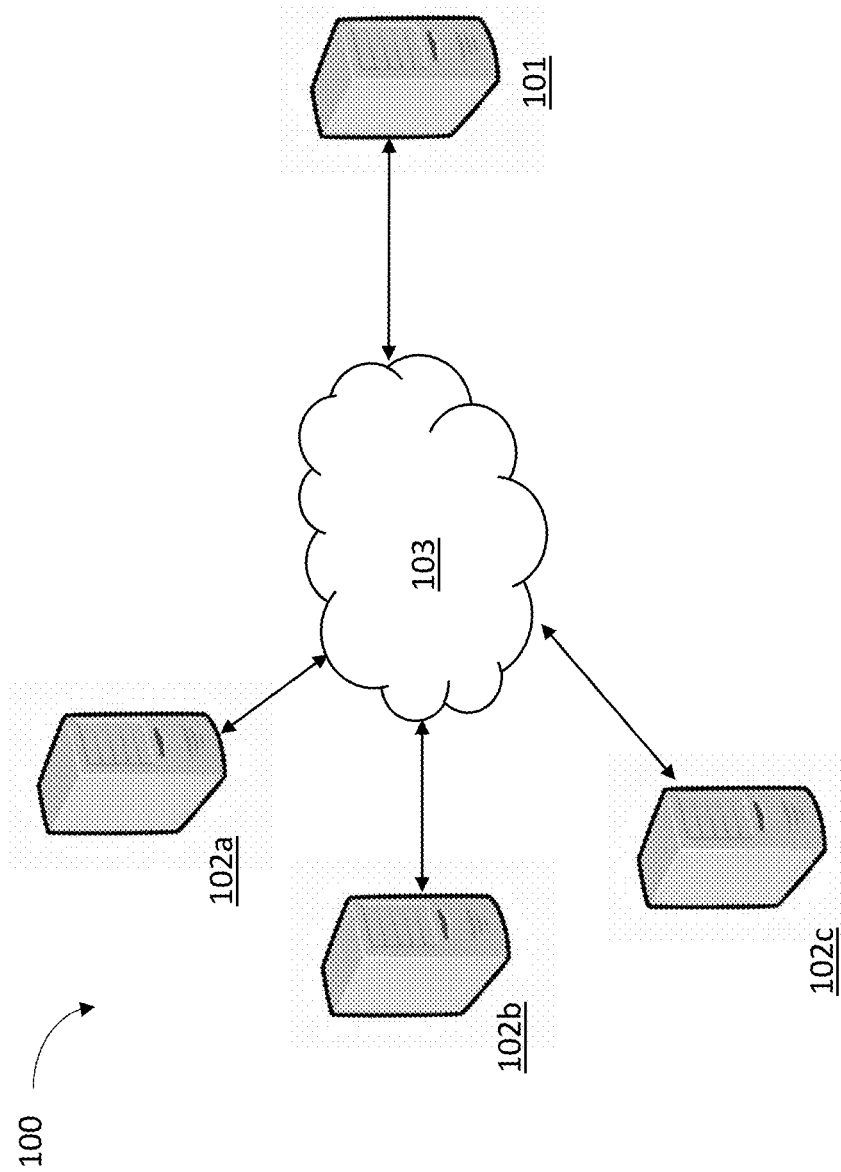
FIG. 1 is a schematic diagram of an automated privileged access analysis (APAA) system, according to some embodiments.

In some embodiments, a method includes retrieving data associated with each account from a set of accounts from one or more computing platforms. The method includes parsing the data to determine, based on a set of rules, a set of characteristics associated with each account from the set of accounts. The set of characteristics includes an account identifier from a set of account identifiers and an entitlement value from a set of entitlement values. The method includes mapping, based on an entitlement value of each account from the set of accounts, a first subset of accounts from the set of accounts to a first privilege value, and mapping, based on an entitlement value of each account from the set of accounts, a second subset of accounts from the set of accounts to a second privilege value. The method includes generating a report indicating the first subset of accounts having the first privilege value and the second subset of accounts having the second privilege value. In some implementations, the method includes scheduling a set of jobs to execute the retrieving step, the parsing step, the mapping of the first subset of accounts step, the mapping of the second subset of accounts step, and the generating step automatically in response to at least one trigger event.

DETAILED DESCRIPTION

Embodiments described herein provide an easy-to-use, customizable, and automated solution to discover, analyze, and manage privileged access rights in a computing environment and risks associated with the privileged access. The computing environment can include hundreds or thousands of computing devices (e.g., servers, client devices, personal computers) running different computing platforms (e.g., Unix®, Linux®, Windows®, cloud) or Information Technology (IT) systems. Each computing platform can have multiple applications or programs running on the computing platform and each application/program can have thousands or more accounts with different privileged access rights to access such applications or programs. In some implementations, the accounts from one or more computing platforms can include accounts from various computing platforms, IT systems, data sources, and/or applications/programs running on the computing platforms or IT systems. Accounts from one or more computing platforms can include, but not limited to, accounts from Active Directory, accounts from Windows® operating system, accounts from Unix/Linux operating system, Azure® AD, Azure® Subscriptions, AWS®, Oracle® Database, Microsoft® SQL Server, LDAP, MongoDB®, Postgres, MySQL, DB2, Informix, GCP. Embodiments described herein provide a method to interact (or exchange data) with different computing platforms, and retrieve and aggregate data (e.g., user IDs, access groups, memberships) associated with the accounts from applications/programs on these computing platforms. Embodiments described herein also provide a schema mapping method to map (or tag), based on a library of predefined and/or configurable rules, the retrieved data with the privileged access rights and store in a centralized database. Embodiments described herein include generating customizable (e.g., current and/or historical view, governance metrics, audit reports) reports of the privileged access rights of accounts from applications/programs on different computing platforms. In some implementations, various steps in the schema mapping process can be performed using the job scheduling capabilities of the system such that discovery, analysis, reporting, and management of the privileged access rights can be performed automatically, periodically, and/or concurrently via multiple threads.

In some embodiments, an apparatus can retrieve data associated with accounts from multiple computing platforms. The apparatus can enable multiple computing platforms to exchange data (e.g., user IDs, access groups, memberships) and execute a schema mapping process(es) and a job scheduling process based on the received data to determine privileged access rights for each account and/or each computing platform. In some implementations, the apparatus can receive data from multiple accounts from each computing platform from multiple computing platforms via a connection through a network. In other words, data can received for example from tens, hundreds, thousands or tens of thousands of accounts from each computing platform, and the network can include for example tens, hundreds, thousands or tens of thousands of computing platforms. For instance, the apparatus can dynamically map or tag accounts as, for example, privileged/non-privileged/service accounts based on business logics/rules to produce related tags, and optionally audit the tags that can change over time. In some implementations, the apparatus can scan tens of thousands of computing platforms via parallelization and multi-threading of job scheduling to retrieve, aggregate, and/or group data associated with accounts from various computing platforms or data sources (e.g., employee directory, activity logs, feeds from other security tools like identity governance systems or password vault systems) and provide additional visibility into account ownership, account usage and existing controls applied to the accounts. This is so, at least in part to determine, via a set of rules, a level of privilege (e.g., privileged-tier-high, privileged-tier-medium, privilege-tier-low, etc.) for each account relative to other accounts and/or computing platforms. In sum, the apparatus can perform these various functions at scale in a very short time.

In some implementations, an apparatus can perform rules and criteria translation, data layer abstraction, data correlations, non-privileged account identification, privileged account identification, and/or service account identification. In some implementations, the apparatus can use queries (e.g., dynamic SQL queries) to manage and process data in a rules table to parse the data received from accounts to determine, based on a set of rules in the rules table, characteristics associated with each account. In some implementations, the apparatus can store the rules table in a database. In some implementations, the apparatus can define the set of rules that include a list of pre-defined privileged rules and criteria to identify accounts as, for example, privileged, non-privileged, service, human, non-human (or different tiers when the accounts are identified as privileged: privileged-tier-high, privileged-tier-medium, privileged-tier-low, and/or the like). In some cases, the apparatus can parse data from tens and thousands of accounts using the set of rules. In some implementations, the apparatus can receive inputs from users to configure and manage the set of rules and/or criteria before and/or after the data associated with each account is retrieved. In some implementations, the apparatus can cluster extracted data from the parsed data based on the factors such as, for example the set of rules. In some cases, the apparatus can cluster extracted data from accounts of the same computing platform, extracted data of the same account (updated data associated with that account), extracted data from accounts associated with substantially same rules, and/or the like.

In some implementations, the apparatus can detect, in real-time, any changes between scans of the computing platforms by performing comparison operations such as, for example, Data Manipulation Language (DML) operations with received data for accounts from the computing devices and previously stored data (in a database) from the same computing devices. In some implementations, the apparatus can organize schedules of job to retrieve, aggregate, group, and/or compare data associated with accounts from various computing platforms or data sources in a job table stored in the database via systems such as, for example, online analytical processing (OLAP) systems, rotational online analytical processing (ROLAP) systems, multidimensional online analytical processing (MOLAP) systems, hybrid online analytical processing (HOLAP) systems, and/or the like. For instance, the apparatus can perform an INSERT, UPDATE, and/or DELETE comparisons for the database to detect any changes in the data from scheduled/executed jobs stored in the database and newly received data for each account from the computing platforms. Once the change(s) are detected, the apparatus can determine if an update to each account's privilege value is needed based on the changes to detected change(s). In some implementations, the apparatus can store data extracted from accounts and/or mappings of accounts to privilege values via inputs received from a user interface. In some implementations, the apparatus can store new data in a second database and synchronize the second database with the databased storing previously received data. In some cases, the apparatus can merge multiple databases to generate a single database via a comparison operation such as, for example, the INSERT, UPDATE, and/or DELETE operations. The apparatus can retrieve, clean, prepare, convert, migrate, integrate, and/or store data in the database.

In some cases, the apparatus can parse data from new data to determine and/or extract disparities in the new data and the data stored in the database (e.g., username, credentials, privilege status, privilege values, etc.). In some instances, the apparatus can parse data from multiple accounts from multiple computing platforms, via tools such as, for example, lexical analyzers, regular expression, natural language processing (NLP) tools, Extensible Markup Language (XML) parsers, JavaScript Object Notation (JSON) parsers, and/or the like. This is so, at least in part, to extract data from any data source in any data format. In some cases, the apparatus can check if any differences in data is due to deletions, insertions, replacements, and/or the like. For example, the apparatus can determine if a username and/or password of an account is updated. In another example, the apparatus can determine if an account itself has been deleted, deactivated, suspended, and/or the like. In some examples, the apparatus can detect software version updates to each account. Additionally, the apparatus can schedule a set of jobs to execute steps of the comparison operation. For instance, during an execution of the set of jobs scheduled to execute a comparison of data, the apparatus can receive new data that requires a higher priority of comparison (based on higher risk score, privilege value, etc.) for a different account than an account that a current comparison operation is associated with. In some cases, the apparatus can schedule and/or execute jobs via single-threading, multi-threading, and/or the like, to reduce execution time, increase efficiency, and/or the like. This is so, at least in part, such that the apparatus can automatically, periodically, and/or continuously perform schema mapping process(es) without a need to re-scan computing platforms. In some implementations, the apparatus can filter received data to extract and/or remove outdated data in the database in response to receiving updated data. In some implementations, the apparatus can also organize new and/or unfamiliar information from the updated data in a structured format. This is so, at least in part, to reduce computational overhead and increase efficiency for the apparatus to execute the job of parsing data.

In some implementations, the apparatus can determine a level of security of an account. For instance, accounts with data (e.g., username, passwords, etc.) that are substantially simple and/or uncomplex can be associated with a low level of security. The apparatus can also determine, based on a set of rules and/or privilege value, a risk score for each account (or a subset of accounts). The risk score can indicate level of risk, and/or potential threat to an account. The risk score can be weighted based on privilege level (e.g., privilege status and/or privilege value) of an account. For instance, the apparatus can calculate a high risk score for an account with a high privilege value (e.g., privileged-tier-high) with a low level of security. In some cases, the apparatus can determine how much weight to apply on a risk score for an account (or subset of accounts) based on a level of privilege for that account (or subset of accounts). In some implementations, the apparatus can identify entitlements granted between accounts. For instance, a first entity associated with a first account on a first platform (e.g., Active Directory) can grant entitlements to a second account in a second platform (e.g., Windows® Server), and as a result the second entity associated with the second account can have privileged access on the second platform. The apparatus can detect the granting of entitlements between accounts due to nested groups, entitlements or both, and tag privileges assigned directly to an individual, instead of using a group or a role, which aids in designing role-based access control (RBAC) model for an organization.

In some implementations, the apparatus can generate a report, compound presentation, visualization, and/or the like, based on re, indicating accounts tagged with a level of privilege (e.g., privileged, non-privileged, etc.). The report can be generated automatically. In some implementations, the report can be customizable and/or interactable with users via a user interface. In some cases, the user interface can be operatively connected to the apparatus and/or be located at a remote user compute device such that the apparatus can send a signal to present the report on the user interface of the remote user compute device. In some implementations, the generated report can also enable users to schedule jobs of schema mapping process(es) for automatic execution. For instance, the apparatus can automate an end-to-end process of mapping and/or tagging data with privileged access rights specified and delivering results of generated reports describing the mapping and/or tagging to users through, for example, email or file sharing. In some implementations, the apparatus can translate, map, and/or alter accounts based on characteristics extracted from parsing the data to privilege values.

In some implementations the apparatus can schedule a set of jobs, based on a trigger event, to automatically execute steps of the schema mapping process(es) for multiple accounts from multiple computing platforms automatically. This is so, at least in part to, in response to receiving data from multiple computing platforms, map multiple accounts from multiple computing platforms to privilege values and generate a report of the results of the schema mapping process(es) automatically. In some implementations, the apparatus can perform query optimization methods such as, for example, heuristic methods, and nonlinear optimizations, and/or the like, to query jobs to be executed. In some cases, the apparatus can perform queries such as, for example, nested queries, recursive queries, cascading queries, and/or the like. The apparatus can also optimize the database via predictions based on historical data, missing data, incomplete data, and/or the like, to identify, for example, non-scheduled jobs for execution.

In some embodiments, the apparatus can schedule jobs to execute steps of the schema mapping process(es) and/or job scheduling process(es) via machine learning. For instance, the apparatus can train a machine learning model(s) to optimize scheduling process of jobs for scheduling jobs and/or executing schema mapping process(es) of scheduled jobs. In some cases, the apparatus can train the machine learning model(s) to predict which jobs are likely to take longer, which jobs have higher priority, and/or the like. This is so, at least in part such that the apparatus automatically and efficiently schedule jobs for execution. In some implementations, the apparatus can train the machine learning model(s) using historical data to predict how long a job will take to complete based on parameters such as, for example, size and/or complexity of data for each account (or subset of accounts). In some implementations, the apparatus can train the machine learning model(s) to execute jobs for each accounts (or a subset of accounts) based on level of priority, order of scheduling of jobs, and/or the like. The apparatus can train the machine learning model(s) to produce a trained machine learning model(s). The apparatus can data received from multiple accounts from multiple computing platforms and execute the trained machine learning model(s) to efficiently schedule jobs of schema mapping process(es) of accounts (or subset of accounts) from the computing platforms using training data that includes training sets of previously scheduled jobs associated with the multiple accounts. The previously scheduled jobs can include information such as, for example, privilege values of an account or sets of accounts. In some implementations, the apparatus can train and/or fine-tune the machine learning model(s) continuously.

As used herein, the singular forms "a," "an" and "the" include plural referents unless the context clearly dictates otherwise. Thus, for example, the term "a privilege value" is intended to mean a single privilege value or multiple privilege values.

FIG. 1 is a schematic diagram of an automated privileged access analysis (APAA) system, according to some embodiments. In some embodiments, the APAA system 100 can include a set of computing devices 102a-102c configured to communicate with an APAA device 101 via a network 103. The set of computing devices 102a-102c and the APAA device 101 can be computing devices including but not limited to computers, servers, processors, data/information processing machines or systems, and/or the like, and may include data storage systems such as databases, memories (volatile and/or non-volatile), and/or the like, operatively coupled to the processors. The set of computing devices 102a-102c and the APAA device 101 can be communicatively coupled, via wired or wireless connections, to the network 103 such as but not limited to the internet, intranet, local area networks (LANs), wide area networks (WANs), and/or the like, using wired communication protocols or standards and/or wireless communication protocols or standards such as WiFi®, LTE®, WiMAX®, and/or the like. The details of the APAA device 101 are discussed below with regards to FIG. 2. In some implementations, the APAA device 101 can be configured to communicate with the set of computing devices 102a-102c to retrieve data from applications/programs run on the set of computing devices 102a-102c, and to generate and send reports of the privileged access rights to the set of computing devices 102a-102c. In some implementations, the set of computing device 102a-

Figure 4:
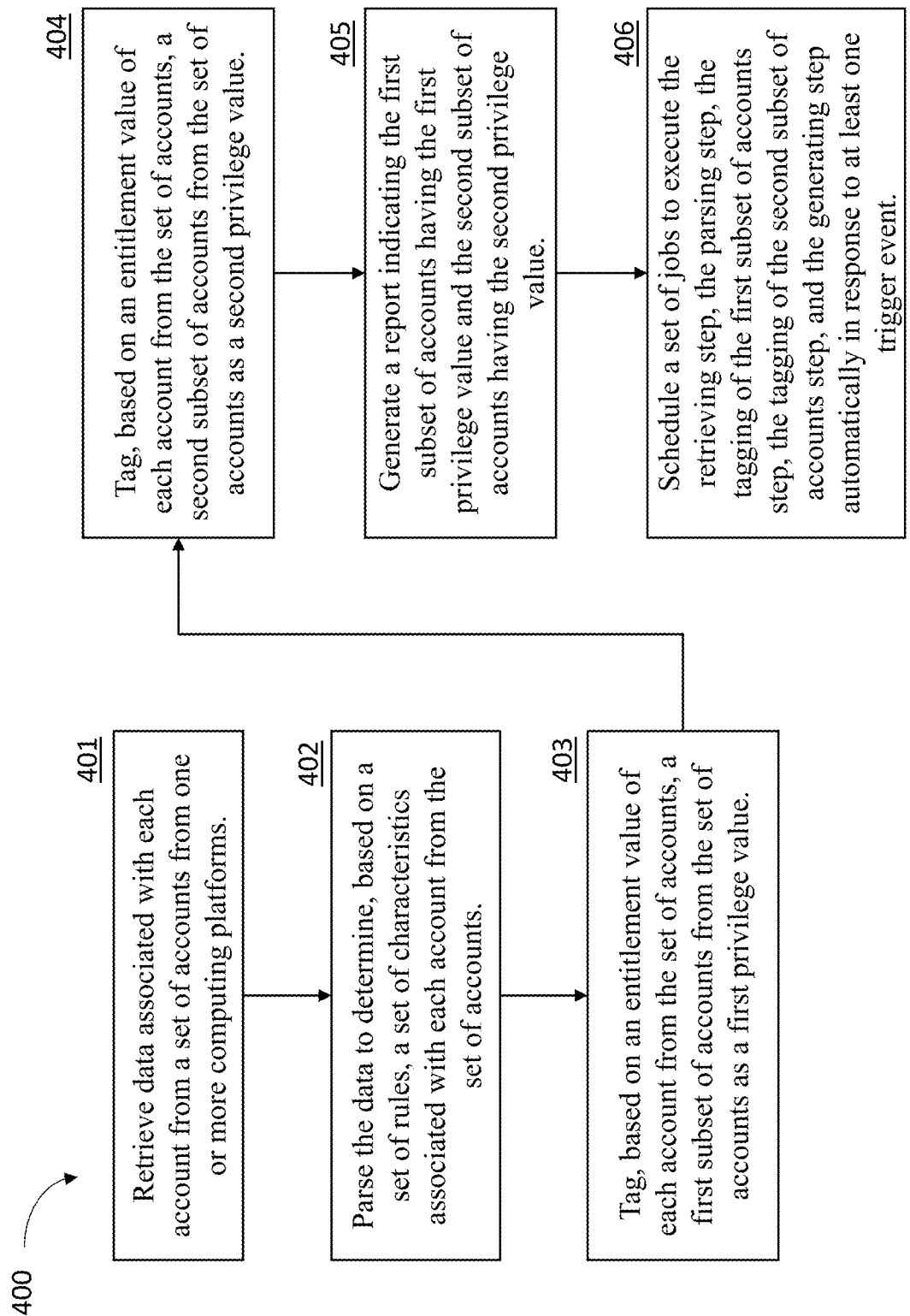
FIG. 4 is a flow chart illustrating the schema mapping process, according to some embodiments.
Figure 5:
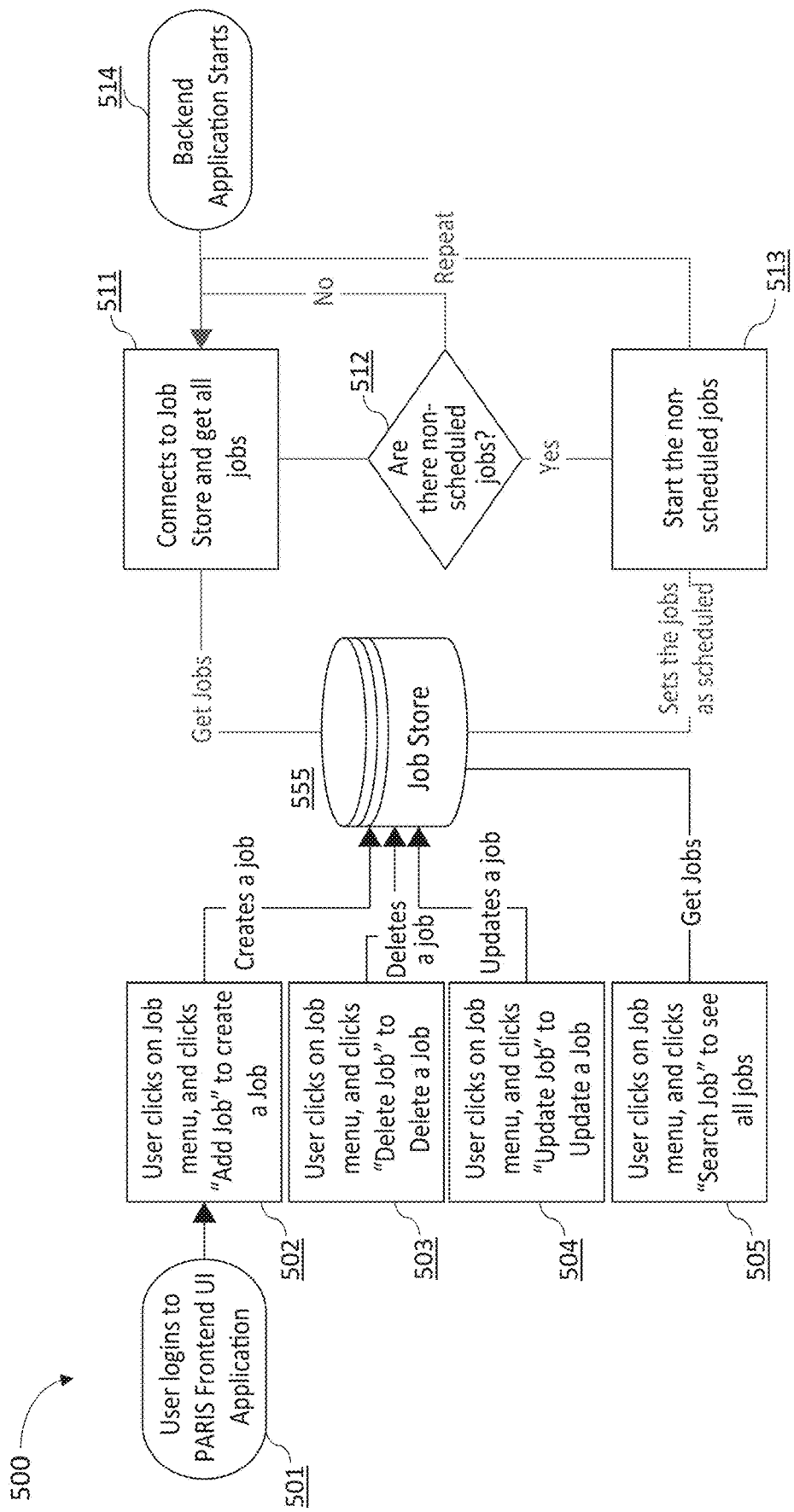
FIG. 5 is a flow chart illustrating the job scheduling process, according to some embodiments.

102c can request (or call) the functions of the APAA device 101 through an Application Programming Interface (API) to configure, update, and/or manage rules, jobs, and/or the like, associated with the schema mapping process and/or the job scheduling process as described with regards to FIGS. 4 and 5.

Figure 2:
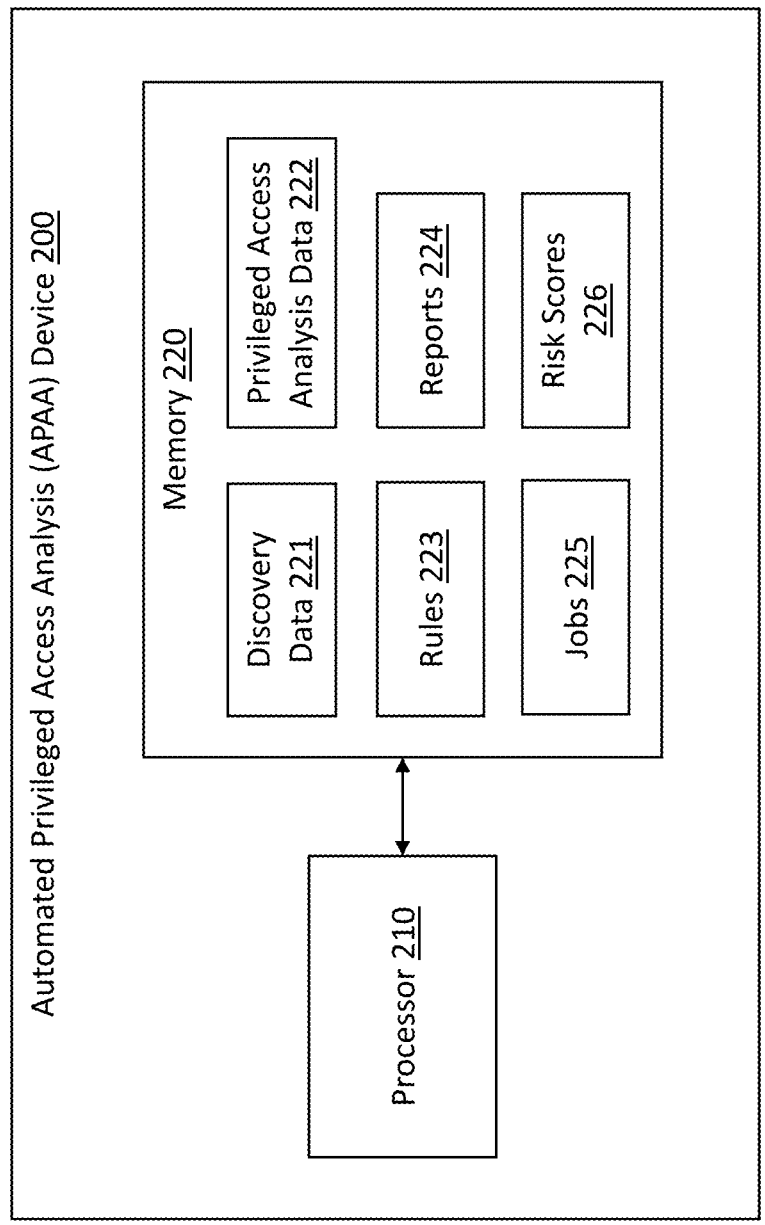
FIG. 2 is a schematic diagram of an automated privileged access analysis (APAA) device, according to some embodiments.

FIG. 2 is a schematic diagram of an automated privileged access analysis (APAA) device, according to some embodiments. In some embodiments, the APAA device 200 is similar structurally and functionally to the APAA device 101 described in FIG. 1. In some implementations, the APAA device 200 can be a computing device (or multiple computing devices) having a processor 210 and a memory 220 operatively coupled to the processor 210. In some instances, the APAA device 200 can be any combination of a hardware-based module(s) (e.g., a field-programmable gate array (FPGA), an application specific integrated circuit (ASIC), a digital signal processor (DSP), a graphics processing unit (GPU)) and/or a software-based module(s) (computer code stored in memory 220 and/or executed at the processor 210) capable of performing one or more specific functions associated with that module. In some instances, the APAA device 200 can be a server such as, for example, a web server, an application server, a proxy server, a telnet server, a file transfer protocol (FTP) server, a mail server, a list server, a collaboration server and/or the like. In some instances, the APAA device 200 can be a personal computing device such as a desktop computer, a laptop computer, a personal digital assistant (PDA), a standard mobile telephone, a tablet personal computer (PC), and/or so forth.

The memory 220 can be, for example, a random-access memory (RAM) (e.g., a dynamic RAM, a static RAM), a flash memory, a removable memory, a hard drive, a database and/or so forth. In some implementations, the memory 220 can include (or store), for example, a database, process, application, virtual machine, and/or other software modules (stored and/or executing in hardware) and/or hardware modules configured to execute a schema mapping process(es) and a job scheduling process as described with regards to FIGS. 4 and 5, respectively. In such implementations, instructions for executing the schema mapping process(es) and the job scheduling process(es) and/or the associated methods can be stored within the memory 220 and executed at the processor 210. In some implementations, the memory 220 can store discovery data 221, privileged access analysis data 222, rules 223, reports 224, jobs 225, risk scores 226, and/or the like. Details of data 221-226 stored in the memory 220 are discussed further with regards to the AAPA device 300 in FIGS. 3A-3B.

The processor 210 can be configured to, for example, write data into and read data from the memory 220, and execute the instructions stored within the memory 220. The processor 210 can also be configured to execute and/or control, for example, the operations of other components of the APAA device 200 (such as a network interface card, other peripheral processing components (not shown)). In some implementations, based on the instructions stored within the memory 220, the processor 210 can be configured to execute one or more steps of the schema mapping process(es) and the job scheduling process(es) as described with regards to FIGS. 4 and 5, respectively.

In some implementations, the APAA device 200 can be configured to provide user interface capabilities, e.g., a graphical user interface, that allows an user, via the APAA device 200 or a computing device (e.g., computing device 102a-102c in FIG. 1) communicatively coupled to the APAA device 200, to configure/change the rules, criteria, reports, jobs associated with the schema mapping process and the job scheduling process.

Figure 3A:
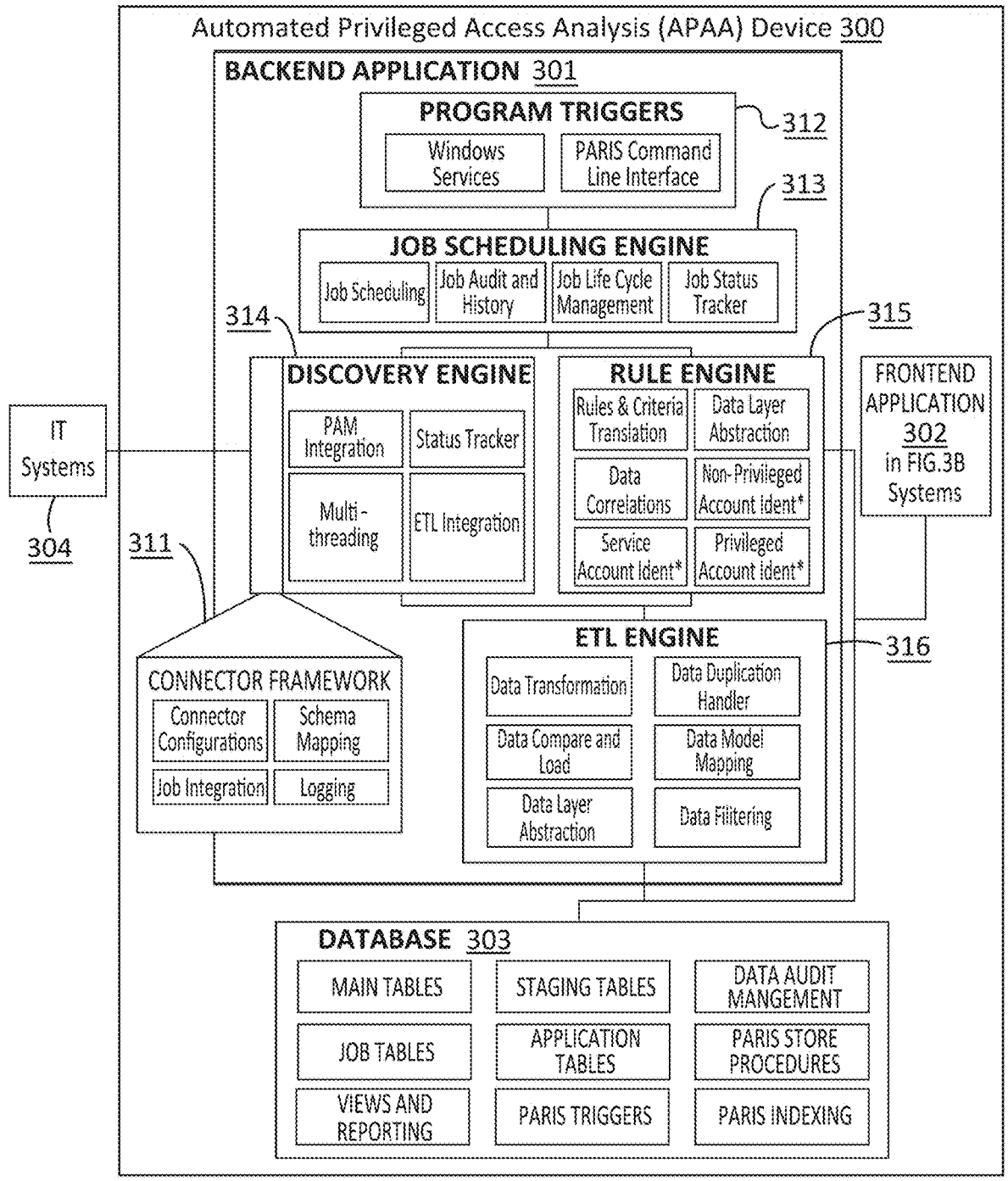
FIGS. 3A-3B show schematic diagrams illustrating example components included in the automated privileged access analysis (APAA) device, according to some embodiments.
Figure 3B:
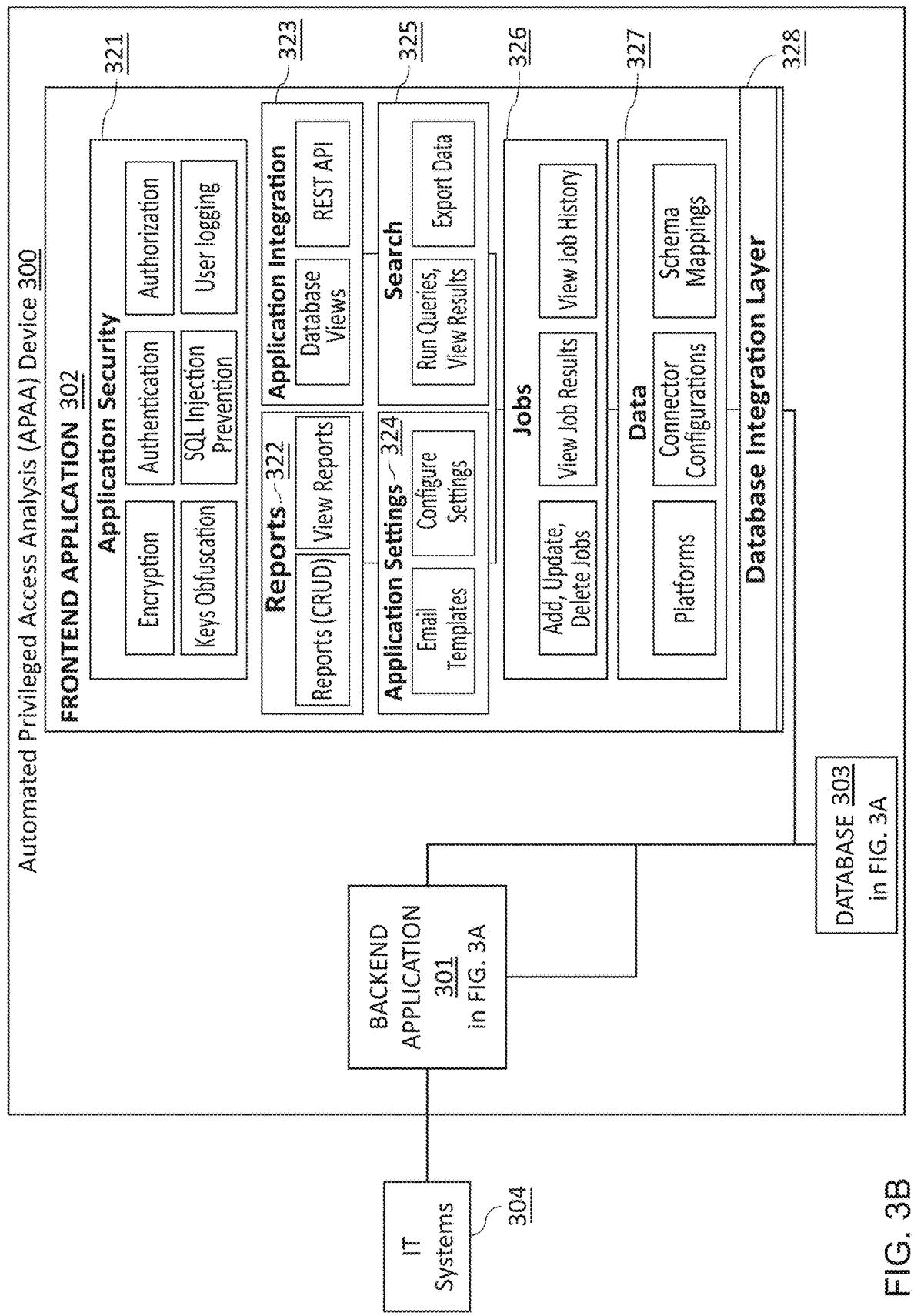

In addition to various types of data 221-226 stored in the memory 220, the APAA device 200 can include data and/or other components (e.g., software programs) that include code or instructions stored in the memory 220 and executable by the processor 210. FIGS. 3A-3B show schematic diagrams illustrating example components included in the automated privileged access analysis (APAA) device, according to some embodiments. The APAA device 300 is similar structurally and functionally to the APAA device 200 described in FIG. 2. The APAA device 300 can be communicatively coupled with Information Technology (IT) systems 304 to discover, analyze, and manage privileged access rights associated with the IT systems 304. The IT systems 304 can include different computing environments having a number of computing devices (e.g., servers, client devices, personal computers) running different computing platforms (e.g., Unix®, Linux®, Windows®, cloud). Each computing platform can have multiple applications or programs running on the computing platform and each application/program can have thousands or more accounts with different privilege access rights to access such applications or programs.

Figure 6A:
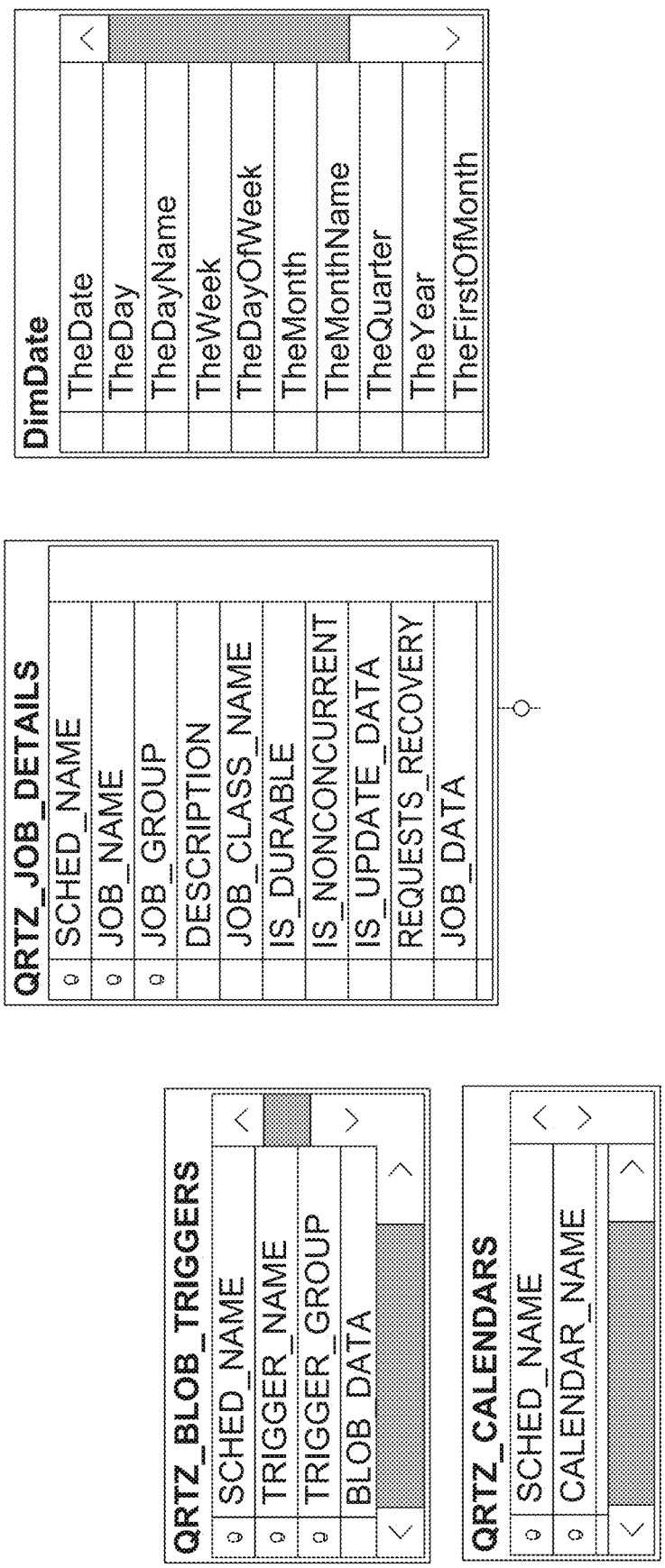
Figure 6A:
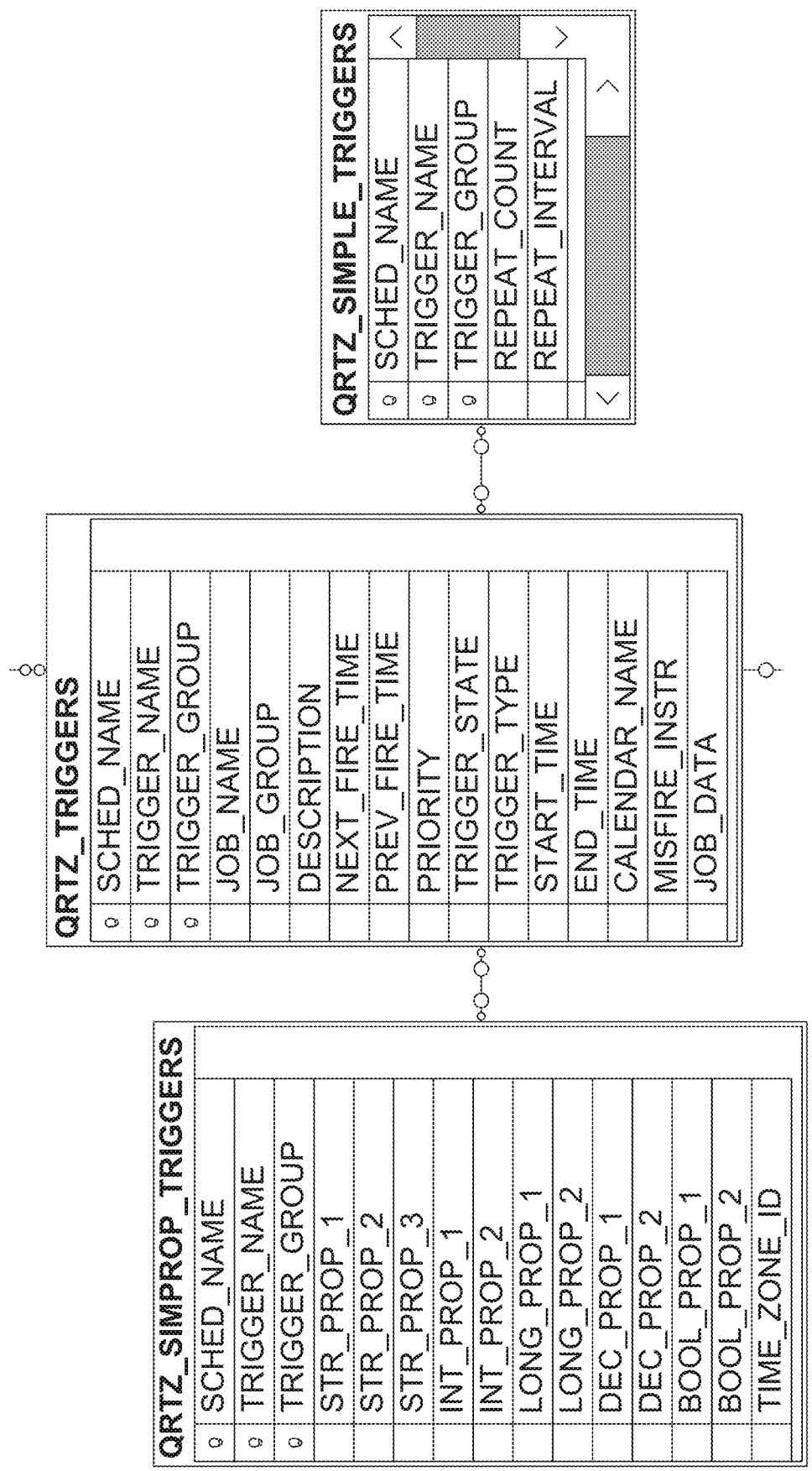

In some embodiments, the APAA device 300 can include a backend application 301, a frontend application 302, and a database 303. The database 303 can store various types of data including, for example, staging tables (e.g., store stage target source data or discovery data 221 in FIG. 2), main tables (e.g., store target source data after transformation from staging table, or the privileged access analysis data 222 in FIG. 2), job tables (e.g., store jobs, triggers, and job histories (including Quartz framework tables), or jobs 225 in FIG. 2), data audit management and triggers (e.g., uses custom developed triggers to record historical data of privileged access analysis), application tables (e.g., store settings and configurations associated with applications, platforms, schema mapping and/or connector framework 311), indexes (e.g., store custom tuned indexes to improve application performance; arrays on user id and entitlement data attributes to improve performance of data search and analysis), store procedures (e.g., custom store procedures to handle some of the heavy processing tasks using database engine), views and reports (e.g., store custom reports and views for reporting and dashboard (e.g., Microsoft® Power BI)). FIGS. 6A-6B show an example database design and schema, according to some embodiments.

Returning to FIG. 3A, the backend application 301 can include software modules/components such as program triggers 312, job scheduling engine 313, discovery engine 314, rule engine 315, connector framework/engine 311, extract transform and load (ETL) engine 316. The software program components 311-316 can include instructions, when executed by at least one processor (e.g., processor 210 in the APAA device 200), causing the at least one processor to perform certain functions. Software modules (executed on hardware) can be expressed in a variety of software languages (e.g., computer code), including C, C++, Java™, Ruby, Visual Basic™ and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

In some implementations, the backend application 301 (e.g., using a combination of the connector engine 311, the ETL engine 316, the rule engine 315, the discovery engine 314, the job scheduling engine 313, and the program triggers 312) can provide a platform to scan tens of thousands of IT systems/computing platforms using job parallelization and multi-threading of job scheduling. In some implementations, the platform can be configured to audit the changes between each discovery scan by performing, for example, an INSERT, UPDATE, DELETE comparisons for database Data Manipulation Language (DML) operations optimization and performance. In some implementations, the platform can be configured for end users to develop their own connectors to pull data, and integrate with, for example, Privileged Access Management (PAM) application to application (A2A) for securing credentials.

In some implementations, the program triggers 312 can be configured to use, for example, Microsoft® TopShelf and command line libraries in, e.g., Microsoft® .Net system as program triggers to run an application(s) as command line interface or Windows® Services.

In some implementations, the connector framework/engine 311 can include software code or instructions (executed on at least one processor) to retrieve, aggregate, or group data associated with accounts from various computing platforms/IT systems/data sources 304 including, but not limited to, Active Directory, Windows®, Unix/Linux, Azure® AD, Azure® Subscriptions, AWS®, Oracle® Database, Microsoft® SQL Server, LDAP, MongoDB®, Postgres, MySQL, DB2, Informix, GCP. In some implementations, the connector framework/engine 311 can retrieve, aggregate, or group data from data sources (e.g., employee directory, activity logs, feeds from other security tools like identity governance systems or password vault systems) and provide additional visibility into account ownership, account usage and existing controls applied to the accounts.

In some implementations, the connector engine 311 can use, for example, .NET framework and open-source libraries to retrieve data from these computing platforms/IT systems 304. In some implementations, the discovery engine 314 and the connector framework/engine 311 can be configured to support integration and multi-threading to extract data from computing devices in the IT systems 304. FIG. 8 shows example code of the connector framework/engine 311 to connect to various computing platforms/IT systems 304 to retrieve data associated with accounts, groups, entitlements, memberships, secrets, and/or the like. FIGS. 9A-9B show an example library of the retrieved data, according to some embodiments.

Returning to FIG. 3A, in some implementations, the ETL engine 316 can include software code or instructions to process or transform data (e.g., transform data associated with accounts from applications/programs on various computing platforms/IT systems 304 in various data formats/database structures into data in a single data format/database structure). In some implementations, the ETL engine 316 can include software code or instructions to perform data duplication handler, data compare and load, data model mapping, data layer abstraction, and/or data filtering. In some implementations, the ETL engine 316 can be configured to use queries (e.g., dynamic SQL queries) to manage and process data in the database 303.

In some implementations, the rule engine 315 can include software code or instructions to dynamically map or tag accounts as, for example, privileged/non-privileged/service accounts based on business logics/rules to produce related tags, and optionally audit the tags that can change over time. In some implementations, the rule engine 315 can include software code or instructions to perform rules & criteria translation, data layer abstraction, data correlations, non-privileged account identification, privileged account identification, and/or service account identification. In some implementations, the rules engine 315 can be configured to use queries (e.g., dynamic SQL queries) to manage and process data in rules table 223 in FIG. 2. In some implementations, the rules engine 315 can store, in database 303 in FIG. 3A or the rules repository 223 in FIG. 2, a list of pre-defined privileged rules and criteria to identify accounts as, for example, privileged, non-privileged, service, human, non-human (or different tiers when the accounts are identified as privileged: privileged-tier-high, privileged-tier-medium, privileged-tier-low, and/or the like). Some rules can be universal, e.g., tag all accounts as "Domain Admins" and "Enterprise Admins" for data received from a specific data source (e.g., Active Directory). The rules can also include, e.g., identifying/tagging accounts as privileged account(s) if the accounts can perform privileged escalations to another identified privileged account(s). The rules can include, for example, identifying the relationship of the privilege as direct or nested, or identifying the number of nested levels. FIGS. 7A-7B show an example library of the privileged rules and criteria, according to some embodiments. In some implementations, the APAA device 300 can provide a user interface through the frontend application 302 for a user to configure and manage the privileged rules and criteria before and/or after the data associated with each account from a set of accounts from one or more computing platforms (or applications/programs run on the computing platforms) is retrieved. The APAA device 300 (via, e.g., the rule engine 315 from the backend application 301 and the user interface from the frontend application 302) can discover and tag accounts that have different privileged access rights not only based on, for example, common-industry definitions, but also based on characteristics specific to a particular organization. For example, a particular organization can use specific naming conventions and/or pre-fixes to label different privileged access rights given to each account. The APAA device 300 can parse and tag the account data based on characteristics of the specific naming conventions/pre-fixes of the particular organization. In some implementations, the APAA device 300 can retrieve data associated with accounts, groups, entitlements, memberships, secrets, and/or the like and tag the accounts with their corresponding privileged access rights as a post-processing step after the data are retrieved. This provides a broader visibility to accounts established on multiple computing platforms, IT systems, and/or applications/programs run on the computing platforms or IT systems. In addition, users from the APAA system 100 can configure/manage/customize/define the privileged rules and criteria for tagging accounts with privileged access rights without the need to re-scan the computing platforms, IT systems, and/or applications/programs run on the computing platforms or IT systems. Returning to FIG. 3A, in some implementations, the backend application 301 (e.g., the rule engine 315) can be configured to use the pre-defined list of privileged rules and criteria and use customized SQL views and SQL queries stored within the database (e.g., 303 in FIG. 3A) to calculate the risk score(s) of each account, and to generate a report(s), a dashboard(s) and/or a visualization(s). The calculated risk scores of each account can be stored in the risk score repository 226 in FIG. 2. In some implementations, the risk score of an account can be calculated based on (1) the privilege access right, (2) the security level of the credential of the account, and/or (3) the priority level of the account. For example, for an account with a high privilege access right (e.g., having access to privileged/confidential data; or privileged-tier-high) and a low security level of the credential (e.g., the password to log into the account is too simple), the risk score is high.

In some implementations, the job scheduling engine 313 can include software code or instructions to schedule jobs to execute, automatically, various functions/instructions in the schema mapping process and/or the job scheduling process as described with regards to FIGS. 4 and 5. In some implementations, the job scheduling engine 313 (e.g., .NET Quartz framework) can be configured to execute jobs in the database 303, track job status, audit job history, and life cycle management of jobs. In some implementations, the rule engine 315, the ETL engine 316, and the job scheduling engine 313 can be configured to automate the end-to-end process of mapping/tagging data with privileged access rights and delivering the results of the privileged reports to end users through, for example, email or file sharing. In some implementations, a user can schedule jobs using the frontend application 302 of the APAA device 300. When a job is scheduled/initiated by the user, the job can be stored in the database (the job tables in database 303 in FIG. 3A or the jobs repository 225 in FIG. 2) waiting to be picked up by the backend application 301. In some implementations, the job scheduling engine 313 can scan the job tables in database 303 periodically (e.g., every 10 seconds) to detect new jobs and existing jobs that can be executed (in response to, e.g., a triggering event (e.g., triggering time) is met.) After the backend application 301 executes the jobs, the job scheduling engine 303 can update the job tables in database 303 (or the jobs repository 225 in FIG. 2) to reflect the execution or completion of the jobs.

In some implementations, the database 303 can use a structure/model of "star schema data model" to optimize (or improve) reporting, business intelligence, visualization and/or analytics of privilege relationships. The database structure can be configured to store the relationships between secrets, systems, accounts, groups, entitlements, and/or memberships in such a way that can be used to tag and identify accounts with privileged access based on the entitlements that accounts have relationships to. The relationships can include, but are not limited to, relationships between account and entitlement, relationships between group and entitlement, relationships between entitlement within another entitlement (nesting), relationships between group within another group (nesting), relationships between account and group, relationships between secret and account, relationships between system and all entities (account, group, entitlement, secret).

In some implementations, an account can be an individual digital identity that a person can use to login to IT systems 304 or applications within the IT systems 304 or various computing platforms. In some implementations, a group can be a group of accounts or a group of multiple entitlements. An entitlement can be an entity that grants an account, a group, another entitlement permissions, privileges, or accesses to IT systems 304 or applications. A secret can be a key, a certificate, or a credential that is associated with permissions from an account. A system can an individual IT system or an application within an IT system or run (executed) on a computing platform.

In some implementations, the backend application 301 can identify or tag an entitlement as privileged (or non-privileged or service, human, non-human) and then find and tag all of the entities (e.g., accounts, groups or entitlements) that have a relationship with the privileged entitlement as privileged (or same privilege value as the entitlement). The identification/tagging of the privileged access rights can be extended beyond different computing platforms. For example, a first entity associated with a first account on a first platform (e.g., Active Directory) can grant entitlements to a second account in a second platform (e.g., Windows® Server), and as a result the second entity associated with the second account can have privileged access on the second platform. In some implementations, the backend application 301 can identify or tag entitlements granted to an account due to nested groups, entitlements or both. In some implementations, the backend application 301 can identify or tag privileges assigned directly to an individual, instead of using a group or a role, which aids in designing the role-based access control (RBAC) model for an organization.

In some implementations, the frontend application 302 can be (or include) a user interface having instructions stored in memory (e.g., memory 220 and executed by the processor 210 in FIG. 2 and/or computing devices that provide the backend application 301). In some implementations, the user can access the user interface (e.g., a graphical user interface, an interactive graphical user interface, a web browser, a smart phone application) on a user's device (e.g., 102a-102c in FIG. 1). In some implementations, the user device (e.g., 102a-102c in FIG. 1) request (or call) the frontend application 302 through an Application Programming Interface (API), such as Representational state transfer (REST), GraphQL, Simple Object Access Protocol (SOAP), Remote Procedure Call (RPC), and/or the like. The frontend application 302, in some implementations, can be requested or called through directly managing requests to the protocol (for instance HTTP, TCP, or RPC calls), or may be managed through a client library or a software development kit (SDK) installed on the user device (e.g., 102a-102c in FIG. 1). Clients and SDKs can be incorporated in "macro" programming languages such as Visual Basic for Applications (VBA) for integration with spreadsheet environments like Google Sheets or Microsoft Excel.

In some embodiments, the APAA device 300 can be configured to provide the backend application 301 and the frontend application 302 via a remote cloud computing server(s) (not shown). For example, the user device (e.g., 102a-102c in FIG. 1) can access the frontend application 302 via a user interface (e.g., a web browser) installed on the user device (e.g., 102a-102c in FIG. 1). The APAA device (e.g., 200 in FIG. 2) can be configured to store instructions of the backend application 301 and the frontend application 302 in the memory 220, and the backend application 301 and the frontend application 302 is executed by the processor 210. The backend application 301 and the frontend application 302 can communicate with a remote cloud computing server(s) (not shown) to perform privileged access rights identification and analysis using the computational resources residing on the remote cloud computing server(s). The results of analysis can be sent to the frontend application 302 and presented to the user interface installed on the user device (e.g., 102a-102c in FIG. 1).

In some implementations, the frontend application 302 can provide the user interface or a platform (or dashboard, e.g., PowerBI dashboard) to show the results of the privileged access rights analysis, display the security criteria, findings and insights across platforms, display the list of accounts with different privileged access rights (e.g., accounts that meet the pre-defined criteria), display the entitlements of accounts that make the accounts, for example, high risk based on weightage, and provide the user interface or platform to enable the user to modify the rules, criteria and/or connector configurations to adjust the privileged definitions based on business logic. In some implementations, the weightage can include risk levels assigned to entitlements based on, for example, administrative access level and impact on the IT system 304.

In some implementations, the frontend application 302 can include software modules/components such as application security 321, reports 322, application integration 323, application settings 324, search 325, jobs 326, data 327, and database integration layer 328. The software program components 321-327 can include instructions, when executed by at least one processor (e.g., processor 210 in the APAA device 200), causing the at least one processor to perform certain functions. Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The reports 322 software module can enable the user, via the user interface, to add, update, modify, delete, and/or view reports of the privileged access rights analysis. The application integration 323 software module can be configured to interact and communicate with various applications in IT systems 304 or computing platforms (e.g., database views and REST API). The application settings 324 software module can allow the user, via the user interface, to adjust email templates and fields, and application settings. The search 325 software module can receive, from the user via the user interface, a search query and run queries (e.g., SQL queries) to, for example, view results and export data (e.g., to a comma-separated value (CSV) file). The jobs 326 software module can enable the user, via the user interface, to manage jobs (e.g., add, update, and/or delete jobs, view job results, view job history, and/or the like). The data 327 software module can enable the user, via the user interface, to configure data received from different platforms from IT systems 304 (e.g., add, update, or delete platforms), configure connector configurations 311, configure schema mappings (the ETL engine 316, the rule engine 315), and configure data having results of the privileged access rights. The database integration layer 328 can interact and communicate with the database 303.

Figure 10A:
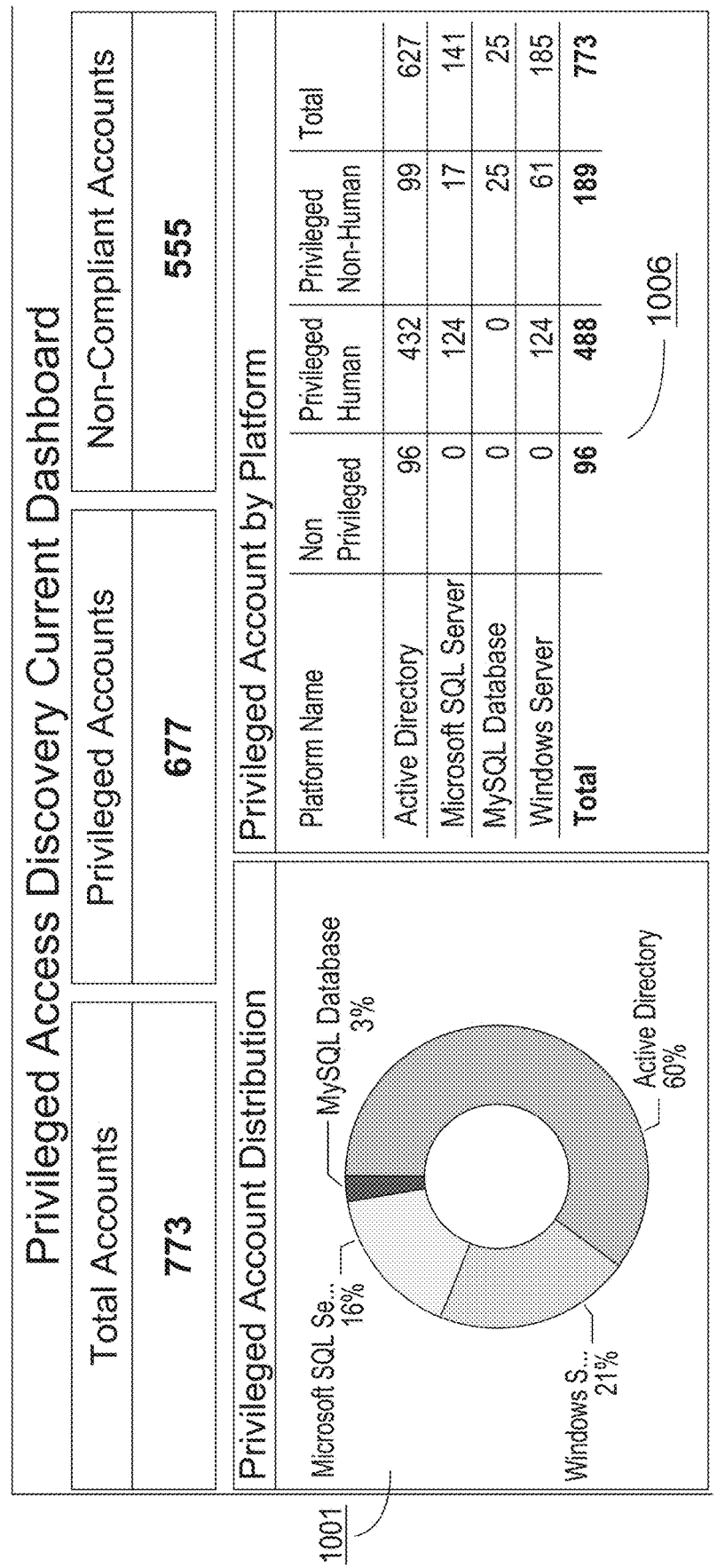
FIGS. 10A-10C show example reports and dashboard of the privileged access rights analysis, according to some embodiments.
Figure 10A:
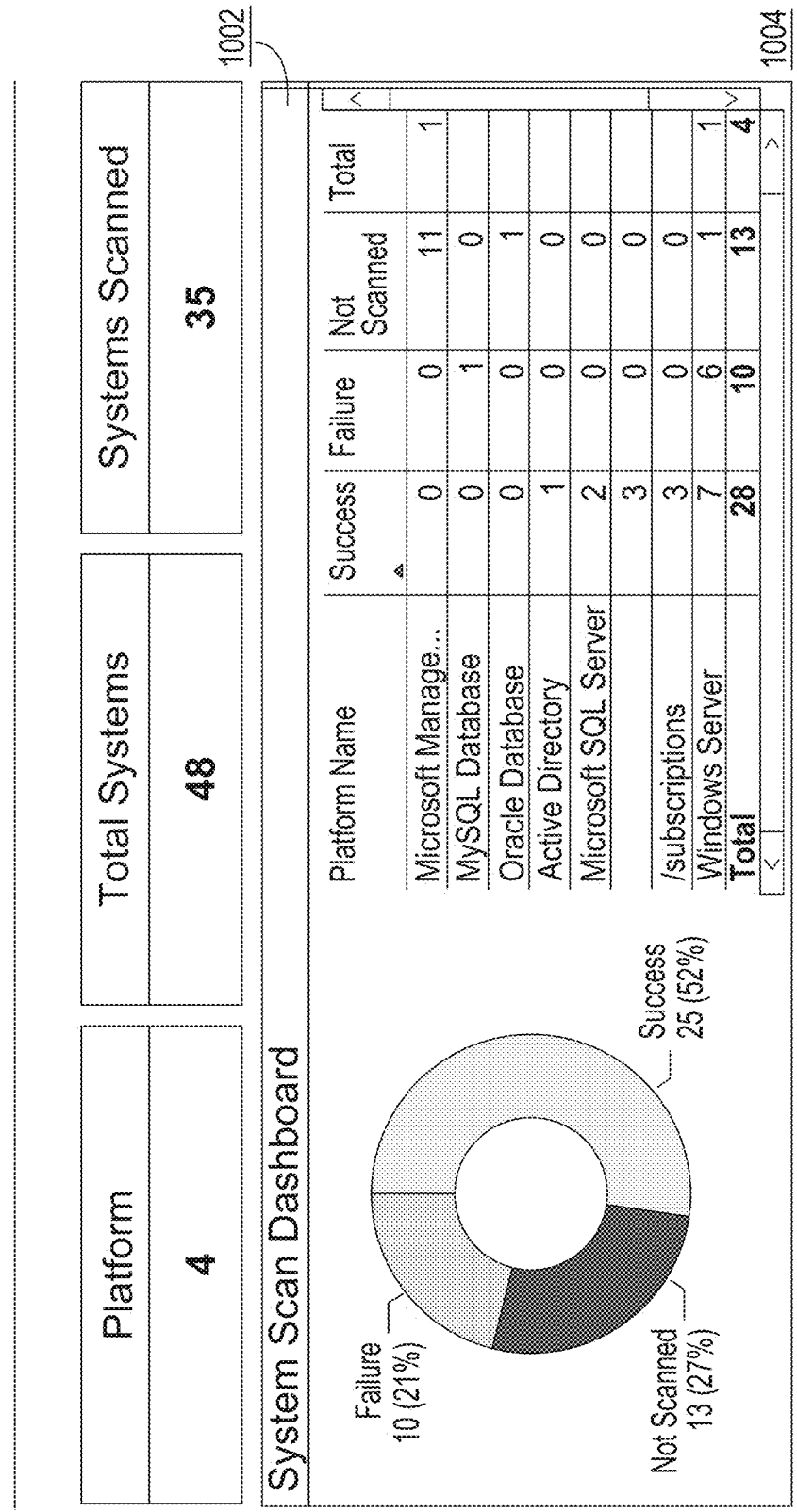
Figure 10A:
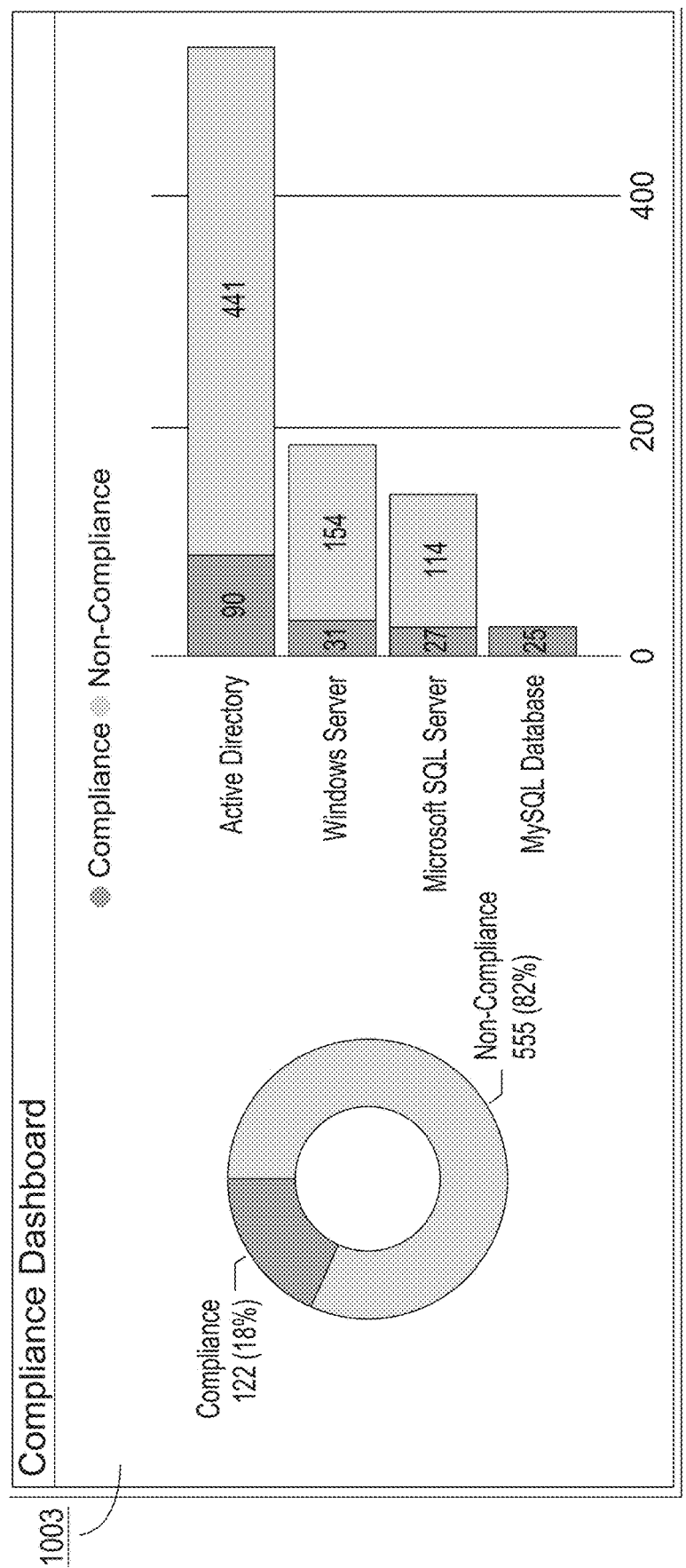
Figure 10B:
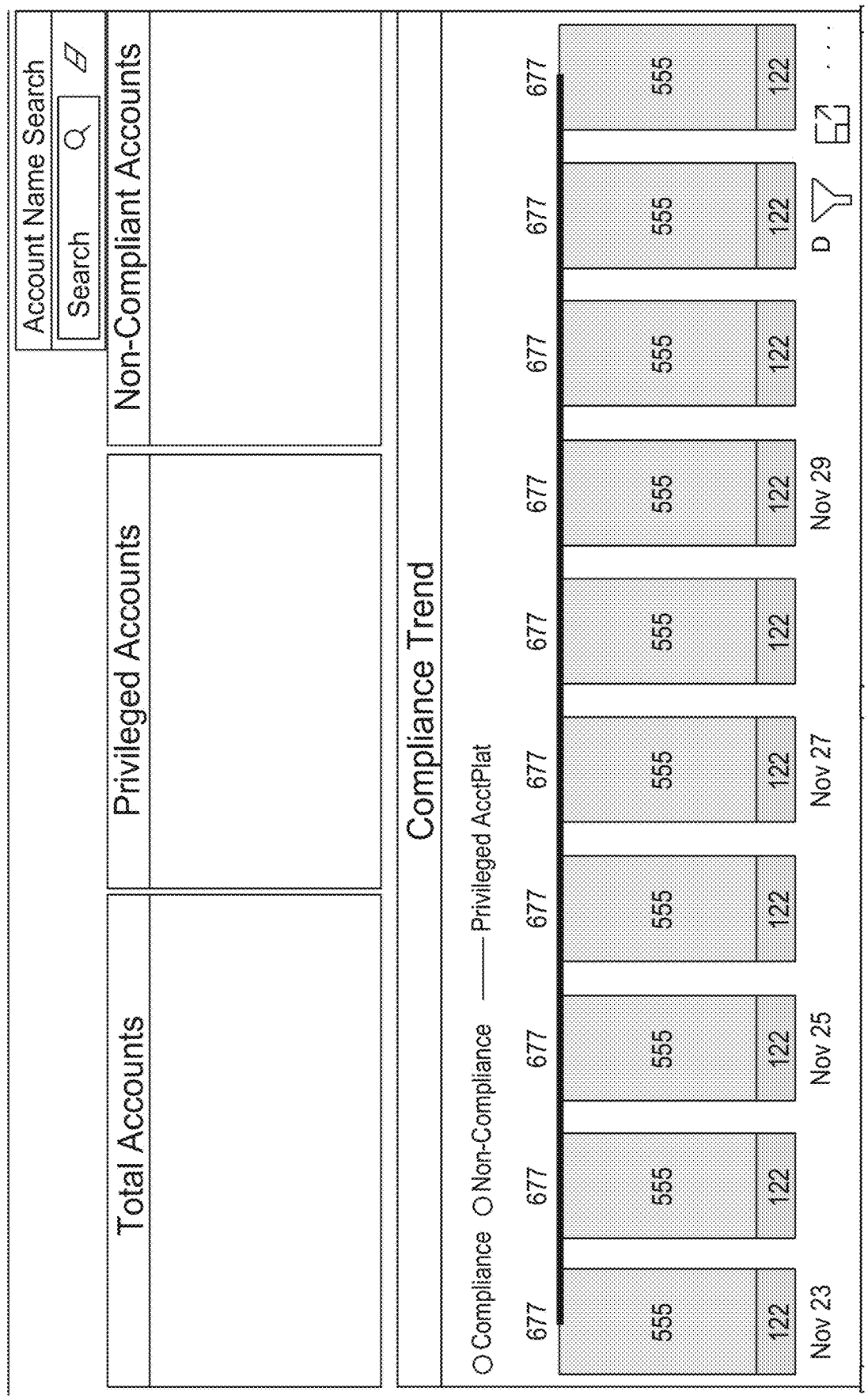
Figure 10B:
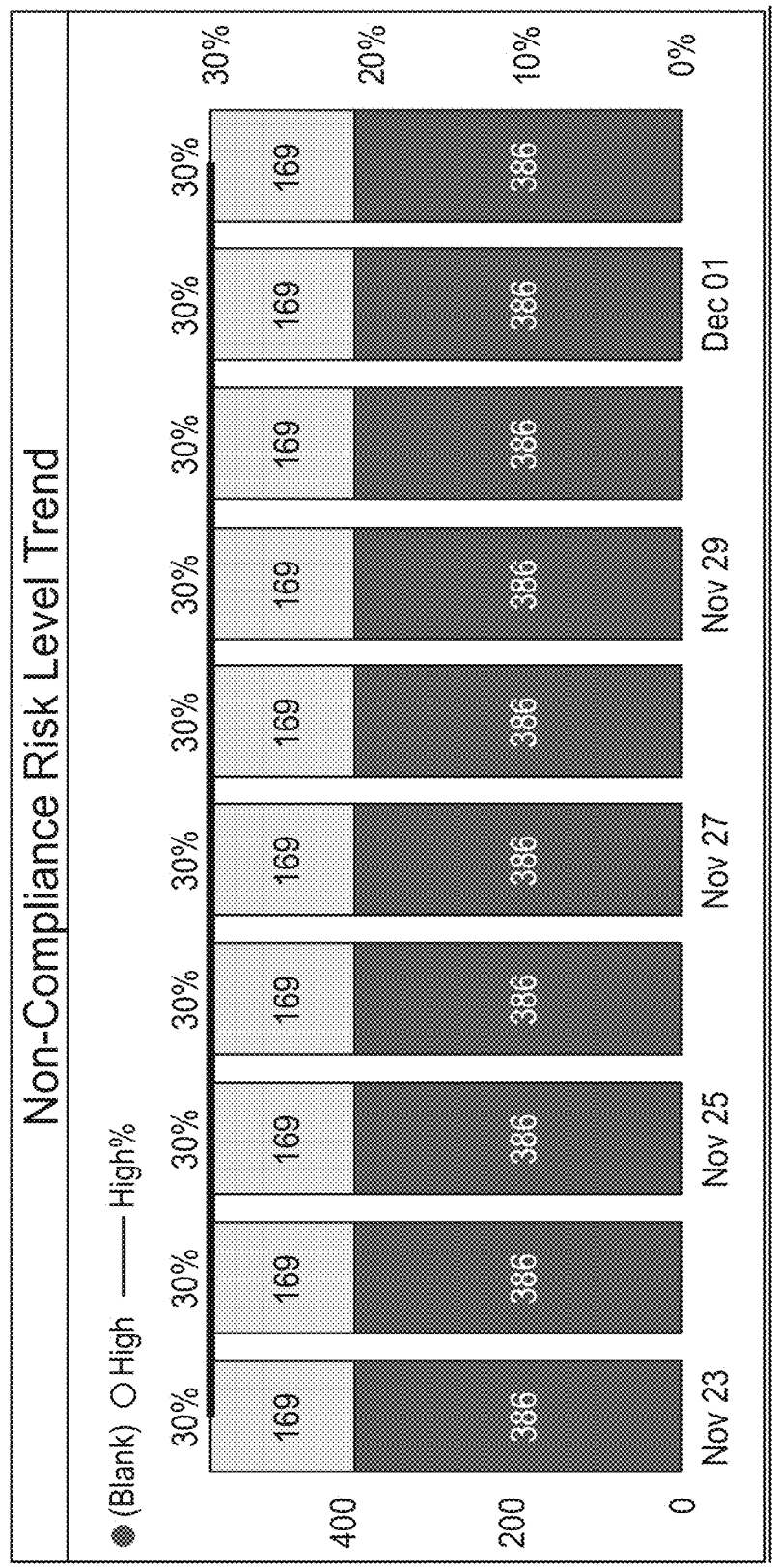
Figure 10C:
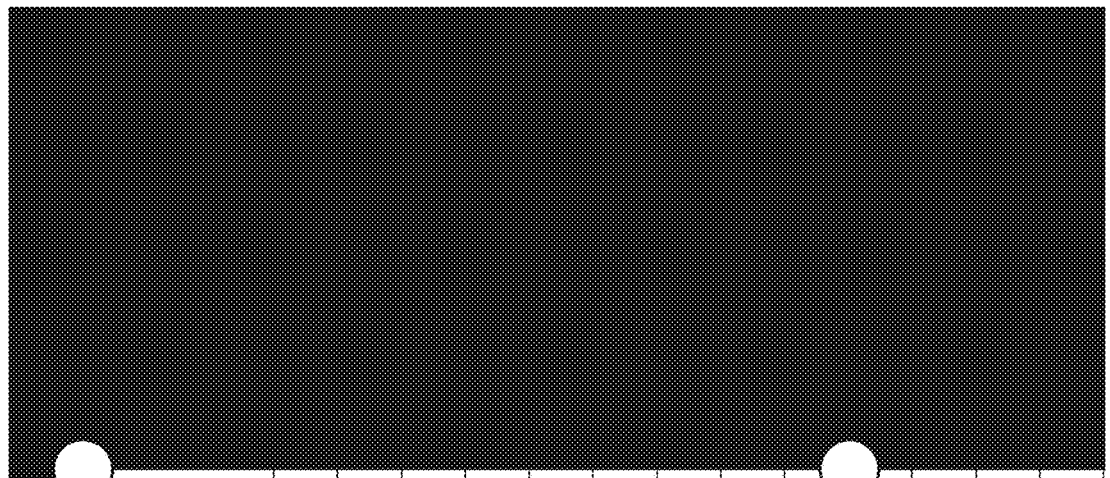

FIGS. 10A-10C show example reports and dashboard of the privileged access rights analysis, according to some embodiments. As shown in FIG. 10A, the results of the privileged access rights analysis can be viewed, in some instances, by computing platforms 1001, privileged accounts (e.g., non-privileged, privileged human, privileged non-human accounts) by platforms 1006, platforms that are scanned or failed to be scanned 1002, accounts or platforms that are in compliance or non-compliance 1003 (e.g., in compliance or non-compliance with organizational security metrics or government regulations), non-compliant human accounts by risk level 1004, non-compliant non-human accounts by risk level 1005. The privileged access rights dashboard (or user interface) can show additional analyses or trends of the accounts, as shown in FIG. 10B. In some implementations, as shown in FIG. 10C, the privileged access rights dashboard (or user interface) can generate reports of the privileged access rights analysis automatically and/or in response to user's input/queries.

FIG. 4 is a flow chart illustrating the schema mapping process, according to some embodiments. The schema mapping process 400 can be implemented at a processor and/or a memory (e.g., processor 210 or memory 220 at the APAA device 200 as discussed with respect to FIG. 2, or the APAA device 100 or 300 as discussed with respect to FIG. 1 or FIGS. 3A-3B respectively.)

At step 401, the schema mapping process 400 includes retrieving data associated with each account from a set of accounts from one or more computing platforms. As discussed herein, in some implementations, the one or more computing platforms can be run on a set of computing devices (e.g., 102a-102c in FIG. 1 or IT Systems 304 in FIGS. 3A-3B) and communicatively coupled with the APAA device. Each computing platform (e.g., Unix®, Linux®, Windows®, cloud, a directory database, Active Directory, Azure® AD, Azure® Subscriptions, AWS®, Oracle® Database, Microsoft® SQL Server, LDAP, MongoDB®, Postgres, MySQL, DB2, Informix, GCP) can have multiple applications or programs running on the computing platform(s), and each application/program can have thousands or more accounts with different privileged access rights to access such applications or programs. In some implementations, the APAA device can communicate with the one or more computing platforms using the connector framework (311 in FIG. 3A). In some implementations, the APAA device can use the discovery engine (314 in FIG. 3A) and the connector framework (311 in FIG. 3A) to support integration and multi-threading job scheduling/executing to extract data from the one or more computing platforms.

At step 402, the schema mapping process 400 includes parsing the data to determine, based on a set of rules, a set of characteristics associated with each account from the set of accounts. The set of characteristics includes an account identifier from a set of account identifiers and an entitlement value from a set of entitlement values. In some implementations, the set of characteristics of each account can also include relationships between account and entitlement, relationships between group and entitlement, relationships between entitlement within another entitlement (nesting), relationships between group within another group (nesting), relationships between account and group, relationships between secret and account, relationships between system and all entities (account, group, entitlement, secret), memberships, secrets.

At step 403, the schema mapping process 400 includes tagging, based on an entitlement value of each account from the set of accounts, a first subset of accounts from the set of accounts as a first privilege value. At step 404, the schema mapping process 400 includes tagging, based on an entitlement value of each account from the set of accounts, a second subset of accounts from the set of accounts as a second privilege value. In some implementations, the privileged value can be privileged, non-privileged, service, human, non-human, privileged-tier-high, privileged-tier-medium, privileged-tier-low, and/or the like.

In some implementations, the schema mapping process 400 can include scanning the one or more computing platforms (e.g., using job parallelization and multi-threading of job scheduling/executing) and detect changes between each discovery scan. In some instances, the APAA device can detect changes between each discovery scan by performing, for example, an INSERT, UPDATE, DELETE comparisons for database Data Manipulation Language (DML) operations optimization and performance. Once the change(s) are detected, the schema mapping process 400 can include determining if an update to each account's privilege value is needed based on the changes to the data and if so, the schema mapping process 400 can update the association/tag between the account and the account's privilege value. In other words, the schema mapping process 400 can include first tagging or associating, based on the first set of characteristics of each account of a first set of accounts, each account from the first set of accounts with a privilege value from a set of privilege values to produce an association between each account and that account's privilege value. The schema mapping process 400 can scan the one or more computing platforms and retrieve updated data associated with a second set of accounts (which might be different from the first set of accounts because, for example, more accounts are created since the last scan, some accounts are deleted since the last scan, accounts have a change of user name, credentials, or privilege status). The schema mapping process 400 can compare the updated data with the previous data (e.g., data from the previous scan or the results data after the privilege access rights analysis) to determine changes between the first set of characteristics of each account from the first set of accounts and a second set of characteristics of each account from the second set of accounts. Subsequently, if changes are detected, the schema mapping process 400 can update the association to generate an updated association between each account from the second set of accounts and a privilege value from the set of privilege values. In some implementations, if changes are detected in response to the scan of accounts from computing platforms, the APAA device 200 can recalculate the risk score of each account or the account(s) that has changed. In the event that the risk score of an account(s) or risk scores of a number of accounts have exceeded a pre-determined threshold, the APAA device 200 can initiate remedial actions to reduce the risk level of the accounts (or risk levels of the computing platforms or applications/programs run on the computing platforms.) The remedial actions can include suspending the account(s) that are at high risk, logging any activities connected to the account(s), closing the account(s), closing the applications/programs where the high-risk accounts are established, deleting all data associated with the account(s). In some implementations, the APAA device 200 can initiate remedial action(s) to a single account or all of the accounts from the application/programs associated with that single account when the risk score of that single account exceeds the threshold. In some implementations, when a statistically-calculated risk score of a number of accounts (e.g., an average risk score of more than 20% of accounts established with an application run on a computing platform) exceeds a pre-determined threshold (or substantially exceeds a pre-determined threshold), the APAA device 200 can initiate remedial action(s) to one or more accounts from the accounts that are at high risk. A risk score substantially exceeding the pr-determined threshold can mean the risk score falls within a range of values that include the pre-determined threshold and a pre-determined margin of the pre-determined threshold.

In some implementations, the schema mapping process 400 can include tagging or identifying accounts based their relationship with other accounts. For instances, each account from a first set of accounts has the privilege value of privileged and a first group identifier identifying that the first set of accounts belongs to a first group of accounts. The APAA device 200 can identify, based on the first group identifier, a second set of accounts that has the same group identifier as the first group identifier of the first set of accounts. The APAA device 200 can tag, based on the privilege value of the first set of accounts, the second set of accounts to the privilege value. In some implementations, the second set of accounts can have a different group identifier indicating that the second set of accounts is nested with the first set of accounts. In other words, the second set of accounts belongs to a second group of accounts within the first group of accounts. Based on the nested group relationship, the APAA device 200 can tag the second set of accounts to the privilege value of the first set of accounts. For example, the first set of accounts can be associated with a first set of account owners who are server administrators (i.e., the first group identifier) of a self-auditing software application at a financial bank (i.e., the entitlement value that identifies the financial bank). The APAA device 200 can map, based on the entitlement value and a set of rules, the first set of accounts as privileged-tier-high. The second group of accounts can be associated with a second set of account owners who are back-up server administrators (i.e., the second group identifier different from the first group identifier, indicating the second set of accounts is nested within the first set of accounts) of a self-auditing software application at the financial bank (i.e., the entitlement value). The APAA device 200 can tag, based on the entitlement value and the set of rules, the second set of accounts as privileged-tier-low. Based on the nesting group relationship between the second set of accounts and the first set of accounts, the APAA device 200 can change the tag or directly tag the second set of accounts as privileged-tier-high. In some implementations, accounts that are mapped as privileged-tier-high can have increased and/or better privilege access rights than accounts that are mapped as privileged-tier-low. In other words, accounts (e.g., privileged-tier-high) with privilege values that are higher than that of other accounts can have increased and/or better privilege access rights than accounts with lower privilege values (e.g., privileged-tier-low).

In some implementations, the schema mapping process 400 can include tagging or identifying accounts based on the nesting entitlement relationship that the accounts have with other accounts. For instances, a first set of accounts can have a characteristic from a first set of characteristics indicating a first entitlement value and a second set of accounts can have a characteristic from a second set of characteristics indicating a second entitlement value. The first set of characteristics and the second set of characteristics indicate that the second entitlement value is nested within the first entitlement value. The APAA device 200 can tag, based on the nesting entitlement relationship, the second set of accounts the same privileged value as the first set of accounts. For example, the first entitlement value of the first set of accounts can be "financial bank self-auditing department" and the second entitlement value of the second set of accounts can be "financial bank self-auditing actuaries department" (nested within the "financial bank self-auditing department"). The APAA device 200 can tag, based on the first entitlement value, the first set of accounts as privileged, and tag, based on the nesting entitlement relationship, the second set of account as privileged. In some implementations, the nested group relationship described in the proceeding paragraph and the nested entitlement relationship can be used interchangeably.

In some implementations, the schema mapping process 400 can include determining, based on a set of rules/criteria, a risk score from a set of risk scores for each account from a set of accounts and adjusting, based on the set of risk scores, the privilege value of each account from the set of accounts. The set of risk scores can be stored in the risk scores 226 repository of the memory 220 in FIG. 2. In some implementations, the risk score of an account can be calculated based on (1) the privilege access right, (2) the security level of the credential of the account, and/or (3) the priority level of the account. For example, for an account with a high privilege access right (e.g., have access to privileged/confidential data; or privileged-tier-high) and a low security level of the credential (e.g., the password to log into the account is too simple), the risk score is high. In some implementations, based on the computing platform of each account from the set of accounts, the schema mapping process 400 can include a platform-specific risk score for each account from the set of accounts.

At step 405, the schema mapping process 400 includes generating a report indicating the first subset of accounts having the first privilege value and the second subset of accounts having the second privilege value. For example, the report can include a table listing identifies of each account retrieved, platforms from which each account is retrieved, credentials associated with each account, privileged access rights of each account, risk scores of each account, and/or the like. The report can also include statistical analysis of the privileged access rights analysis (e.g., the percentage of accounts retrieved being privileged accounts, or a breakdown of privileged accounts by platforms). FIGS. 10A-10C show example reports and dashboard of the privileged access rights analysis, according to some embodiments.

At step 406, the schema mapping process 400 includes scheduling a plurality of jobs to execute the retrieving step, the parsing step, the tagging of the first subset of accounts step, the tagging of the second subset of accounts step, and the generating step automatically in response to at least one trigger event. In some implementations, the at least one trigger event can be a time limit. For example, the APAA device can schedule jobs (i.e., actions, or steps in the schema mapping process) periodically, on a recurrent basis, or in response to a scan of accounts from computing platforms. In some implementations, the APAA device can schedule, through multi-threading, jobs (i.e., actions, or steps in the schema mapping process). For example, the APAA device can schedule the jobs of retrieving data from various computing platforms through multi-threading so that multiple computing platforms can be scanned for data associated with accounts at the same time or substantially at the same time. In some implementations, the APAA device can periodically and automatically detect whether new jobs are scheduled and waiting to be executed and automatically execute the new jobs in response to the at least one trigger event.

FIG. 5 is a flow chart illustrating the job scheduling process, according to some embodiments. The job scheduling process 500 can be implemented at a processor and/or a memory (e.g., processor 210 or memory 220 at the APAA device 200 as discussed with respect to FIG. 2, or the APAA device 100 or 300 as discussed with respect to FIG. 1 or FIGS. 3A-3B respectively.)

In some implementations, the job scheduling process includes steps of scheduling jobs 501-505 and steps of executing jobs 511-514. In some implementations, when scheduling jobs, a user can access the APAA frontend application (e.g., 302 in FIGS. 3A-3B) via a user interface at step 501 and configure and manage jobs (e.g., add jobs 502, delete jobs 503, update jobs 504, or search jobs 505). The user's configuration/actions of the job scheduling can be stored in the jobs store 555 (e.g., job tables in the database 303 or jobs repository 225 in FIG. 2). In some implementations, the jobs can be automatically scheduled and saved in the job store 555 by the APAA device without user input.

In some implementations, when executing jobs, the APAA device (e.g., job scheduling engine 313 of the backend application 301 in FIGS. 3A-3B) can start 514 by connecting to the job store 555 and retrieve a set of jobs 511. The APAA device can determine 512 whether there are non-scheduled jobs by querying the job store 555 and if there are non-scheduled jobs in the job store 555, the APAA device can configure the set of jobs as scheduled to be executed via either single-threading or multi-threading (or some jobs to be executed via single-threading and other jobs to be executed via multi-threading) 513. In some implementations, the APAA device can periodically and automatically detect whether new jobs are scheduled and waiting to be executed and automatically execute the new jobs in response to the at least one trigger event.

In some implementations, the APAA system (as described as 100 in FIG. 1 and including the APAA devices 200 in FIG. 2 and 300 in FIGS. 3A-3B) can be configured to provide the discovery, centralized inventory, analytics, reporting, audit and compliance support, and automation copiabilities of privileged access rights analysis of accounts from various computing platforms. Specifically, the APAA system can provide ongoing account discovery (also known as data aggregation) and store accounts, groups, entitlements and memberships from target systems and platforms. Nested memberships can be resolved as per platform's permission inheritance rules (e.g., Active Directory allows nested permission inheritance). The APAA system can provide centralized inventory of user accounts and entitlements across the organization enabling insight into environment risk and opportunities for remediation. This centralized inventory also provides a layer of abstraction for Identity Governance and Administration (IGA) and PAM solution and support aggregation of access data for systems not integrated to these solutions. The APAA system can identify and tag accounts, groups and entitlements as privileged using a set of customizable rules/criteria including identifying ghost, privileged and non-privileged accounts (shadow admins) using standard (group membership) and environment specific criteria. The APAA system can correlate accounts to owners. The APAA system can provide standardized PowerBI dashboard and a flexible reporting feature to generate privileged account reports. The APAA system provides reports and metrics for users and generate reports through raw SQL queries, which provide users flexibility to correlate different sources of data into meaningful and actionable reports. The APAA system can also provide email integration capabilities so users can send reports to, for example, platform owners directly. The APAA system can provide audit and compliance support. For example, the APAA system can enable users to configure standardized reports and queries streamline audit support by reducing manual intervention on producing audit artifacts and evidence. The APAA system can execute the schema mapping process and the job scheduling process automatically. In some implementations, account discovery, reporting and privileged analytics jobs (and/or other jobs in the schema processing process) can be run at any time on a recurrent basis, hence, minimize (or reduce) manual work used to maintain the application. In some implementations, job failures can notify APAA administrator(s) (e.g., through email) for immediate attention and remedying actions.

In some implementations, the schema mapping process and the job scheduling process discussed herein can automatically scan tens of thousands of IT systems/computing platforms using job parallelization and multi-threading of job scheduling and job execution, providing an efficient method to parallelly manage privileged access rights of accounts and an improvement in the performance of the network architecture/platforms. In some implementations, the APAA system discussed herein can initiate remedial actions to increase the security of the network architecture in response to an automatic scan for change associated with accounts from multiple computing platforms and a calculation (and/or a re-calculation) of risk scores associated with such accounts.

In some implementations, the APAA device discussed herein does not enable, provision or grant users/clients privileged access to target systems or serve as an intermediary in any way. In these implementations, the APAA device discussed herein can act as the client (or be implemented at the client's device (e.g., 102a-102c in FIG. 1) and connect to target computing platforms (or IT systems) to discover accounts, credentials, or keys (including, but not limited to: Google® Cloud Keys, Azure® service principals/keys, and Linux SSH Keys) that have privileged access to target computing platforms (or IT systems).

As used herein, the singular forms "a," "an" and "the" include plural referents unless the context clearly dictates otherwise. Thus, for example, the term "an educational content file" is intended to mean a single educational content file or multiple educational content files with similar functionalities. For another example, the term "an ordered playlist" is intended to mean a single ordered playlist or multiple ordered playlists.

While various embodiments have been described and illustrated herein, one will readily envision a variety of other means and/or structures for performing the function and/or obtaining the results and/or one or more of the advantages described herein, and each of such variations and/or modifications is deemed to be within the scope of the embodiments described herein. More generally, one will readily appreciate that all parameters, dimensions, materials, and configurations described herein are meant to be examples and that the actual parameters, dimensions, materials, and/or configurations will depend upon the specific application or applications for which the teachings is/are used. One will recognize, or be able to ascertain using no more than routine experimentation, many equivalents to the specific embodiments described herein. It is, therefore, to be understood that the foregoing embodiments are presented by way of example only and that, within the scope of the disclosure, including the appended claims and equivalents thereto, disclosed embodiments may be practiced otherwise than as specifically described and claimed. Embodiments of the present disclosure are directed to each individual feature, system, tool, element, component, and/or method described herein. In addition, any combination of two or more such features, systems, articles, elements, components, and/or methods, if such features, systems, articles, elements, components, and/or methods are not mutually inconsistent, is included within the scope of the present disclosure.

The above-described embodiments can be implemented in any of numerous ways. For example, embodiments may be implemented using hardware, software or a combination thereof. When implemented in software, the software code can be stored (e.g., on non-transitory memory) and executed on any suitable processor or collection of processors, whether provided in a single computer or distributed among multiple computers.

Further, it should be appreciated that a compute device including a computer can be embodied in any of a number of forms, such as a rack-mounted computer, a desktop computer, a laptop computer, netbook computer, or a tablet computer. Additionally, a computer can be embedded in a device not generally regarded as a computer but with suitable processing capabilities, including a smart phone, smart device, or any other suitable portable or fixed electronic device.

Also, a computer can have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer can receive input information through speech recognition or in other audible format.

Such computers can be interconnected by one or more networks in any suitable form, including a local area network or a wide area network, such as an enterprise network, and intelligent network (IN) or the Internet. Such networks can be based on any suitable technology and can operate according to any suitable protocol and can include wireless networks, wired networks or fiber optic networks.

The various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine.

In this respect, various disclosed concepts can be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but can be distributed in a modular fashion amongst a number of different computers or processors to implement various aspects of the disclosure.

Computer-executable instructions can be in many forms, such as program modules, executed by one or more computers or other devices. Generally, program modules include routines, programs, objects, components, data structures, etc. that perform particular tasks or implement particular abstract data types. Typically the functionality of the program modules can be combined or distributed as desired in various embodiments.

Also, various concepts can be embodied as one or more methods, of which an example has been provided. The acts performed as part of the method may be ordered in any suitable way. Accordingly, embodiments can be constructed in which acts are performed in an order different than illustrated, which can include performing some acts simultaneously, even though shown as sequential acts in illustrative embodiments. All publications, patent applications, patents, and other references mentioned herein are incorporated by reference in their entirety.

What is claimed is:

1. A non-transitory, processor-readable medium storing instructions that when executed by a processor, cause the processor to:
retrieve data associated with each account from a plurality of accounts from a plurality of computing platforms;
parse the data associated with each account from the plurality of accounts to extract, based on a set of rules, a plurality of characteristics that is associated with that account and that includes an account identifier from a plurality of account identifiers and an entitlement value from a plurality of entitlement values;
map, based on an entitlement value from the plurality of entitlement values and associated with each account from the plurality of accounts, a first subset of accounts from the plurality of accounts to a first privilege value;
map, based on an entitlement value from the plurality of entitlement values and associated with each account from the plurality of accounts, a second subset of accounts from the plurality of accounts to a second privilege value;
generate a report indicating (1) the first subset of accounts having the first privilege value and the second subset of accounts having the second privilege value and (2) for each computing platform from the plurality of computing platforms, a number of non-compliant human accounts at that computing platform and a number of non-compliant non-human accounts at that computing platform;
schedule a plurality of jobs to execute the instruction to retrieve, the instruction to parse, the instruction to map the first subset of accounts, the instruction to map the second subset of accounts, and the instruction to generate, automatically in response to at least one trigger event;
determine, based on the set of rules, a risk score from a plurality of risk scores for each account from the first subset of accounts;
adjust, based on the plurality of risk scores, the first privilege value of each account from the first subset of accounts; and
in response to a percentage of risk scores from the plurality of risk scores exceeding a predetermined threshold, cause a remedial action to occur at an account from the plurality of accounts.

2. The non-transitory, processor-readable medium of claim 1, wherein the instructions further cause the processor to:
store the plurality of jobs in a database; and
send an update to the database in response to the automatic execution, via the at least one trigger event, of the instruction to retrieve, the instruction to parse, the instruction to map the first subset of accounts, the instruction to map the second subset of accounts, and the instruction to generate, of the plurality of jobs.

3. The non-transitory, processor-readable medium of claim 1, wherein:
the data associated with each account from the plurality of accounts are previous data;
the plurality of accounts is a first plurality of accounts;
the plurality of characteristics is a first plurality of characteristics;
the instructions further include instructions to cause the processor to:
associate, based on the first plurality of characteristics of each account of the first plurality of accounts, each account from the first plurality of accounts with a privilege value from a plurality of privilege values to produce an association between each account from the first plurality of accounts with a privilege value from the plurality of privileged values;
retrieve updated data associated with a second plurality of accounts from the plurality of computing platforms;
compare the updated data with the previous data to determine changes between the first plurality of characteristics of each account from the first plurality of accounts and a second plurality of characteristics of each account from the second plurality of accounts; and update the association to generate an updated association between each account from the second plurality of accounts and a privilege value from the plurality of privilege values.

4. The non-transitory, processor-readable medium of claim 1, wherein:
the plurality of accounts includes a third subset of accounts;
the plurality of characteristics of each account of the plurality of accounts includes a group identifier from a plurality of group identifiers;
the instructions further includes instructions to cause the processor to:
identify, based on the group identifier from the plurality of group identifiers for each account of the plurality of accounts, a third subset of accounts that has a group identifier that is identical to a group identifier of the first subset of accounts; and
map, based on the first privilege value of the first subset of accounts, the third subset of accounts to the first privilege value.

5. The non-transitory, processor-readable medium of claim 1, wherein:
the plurality of entitlement values includes a first entitlement value and a second entitlement value, each account of the first subset of accounts having the first entitlement value,
the second entitlement value having a nesting association with the first entitlement value,
the instructions further includes instructions to cause the processor to:
identify a third subset of accounts from the plurality of accounts based on each account of the third subset of accounts having the second entitlement value; and
map, based on the identification, the third subset of accounts to the first privilege value.

6. The non-transitory, processor-readable medium of claim 1, wherein the instructions further include instructions to cause the processor to provide a user interface to receive user input to configure the set of rules.

7. The non-transitory, processor-readable medium of claim 1, wherein:
the first privilege value indicates a higher-tiered privileged access than the second privilege value.

8. The non-transitory, processor-readable medium of claim 1, wherein the instructions further cause the processor to:
generate, based on the risk score and a computing platform of each account from the first subset of accounts, a platform-specific risk score, the computing platform of each account from the first subset of accounts being from the plurality of computing platforms.

9. The non-transitory, processor-readable medium of claim 1, wherein the instructions further cause the processor to:
schedule, through multi-threading, the retrieving of the data associated with each account from the plurality of accounts.

10. The non-transitory, processor-readable medium of claim 1, wherein the instructions further include instructions to cause the processor to:
periodically and automatically detect whether new jobs are scheduled and waiting to be executed; and
automatically execute the new jobs in response to the at least one trigger event.

11. A non-transitory, processor-readable medium storing instructions that when executed by a processor, cause the processor to:
retrieve data associated with each account from a plurality of accounts from a plurality of computing platforms;
parse the data associated with each account from the plurality of accounts to extract, based on a set of rules, a plurality of characteristics that is associated with that account and that includes an account identifier from a plurality of account identifiers and an entitlement value from a plurality of entitlement values;
determine, based on the set of rules, a risk score from a plurality of risk scores for each account from the plurality of accounts;
in response to a percentage of risk scores from the plurality of risk scores exceeding a predetermined threshold, cause a remedial action to occur at an account from the plurality of accounts;
map, based on an entitlement value from the plurality of entitlement values and associated with each account from the plurality of accounts, a first subset of accounts from the plurality of accounts to a first privilege value;
map, based on an entitlement value from the plurality of entitlement values and associated with each account from the plurality of accounts, a second subset of accounts from the plurality of accounts to a second privilege value;
adjust, based on the plurality of risk scores, at least one of the first privilege value of each account from the first subset of accounts or the second privilege value of each account from the second subset of accounts;
generate a report indicating (1) the first subset of accounts having the first privilege value and the second subset of accounts having the second privilege value and (2) for each computing platform from the plurality of computing platforms, a number of non-compliant human accounts at that computing platform and a number of non-compliant non-human accounts at that computing platform; and
schedule a plurality of jobs to automatically execute the instruction to retrieve, the instruction to parse, the instruction to determine, the instruction to map the first subset of accounts, the instruction to map the second subset of accounts, and the instruction to generate, in response to at least one trigger event.

12. The non-transitory, processor-readable medium of claim 11, wherein:
the data associated with each account from the plurality of accounts are previous data;
the plurality of accounts is a first plurality of accounts;
the plurality of characteristics is a first plurality of characteristics;
the instructions further include instructions to cause the processor to:
associate, based on the first plurality of characteristics of each account of the first plurality of accounts, each account from the first plurality of accounts with a privilege value from a plurality of privilege values to produce an association between each account from the first plurality of accounts with a privilege value from the plurality of privilege values;
retrieve updated data associated with a second plurality of accounts from the plurality of computing platforms;
compare the updated data with the previous data to determine changes between the first plurality of characteristics of each account from the first plurality of accounts and a second plurality of characteristics of each account from the second plurality of accounts; and update the association to generate an updated association between each account from the second plurality of accounts and a privilege value from the plurality of privilege values.

13. The non-transitory, processor-readable medium of claim 11, wherein the instructions further include instructions to cause the processor to:

periodically and automatically detect whether new jobs are scheduled and waiting to be executed; and automatically execute the new jobs in response to the at least one trigger event.

14. The non-transitory, processor-readable medium of claim 11, wherein the instructions further include instructions to cause the processor to:

store the plurality of jobs in a database; and query the database to retrieve the plurality of jobs to automatically execute the instruction to retrieve, the instruction to parse, the instruction to map the first subset of accounts, the instruction to map the second subset of accounts, and the instruction to generate in response to the at least one trigger event.

15. An apparatus, comprising:

a processor;

a database; and a memory operatively coupled to the processor, the memory storing instructions to cause the processor to:

retrieve data associated with each account from a plurality of accounts from one or more computing platforms;

parse the data associated with each account from the plurality of accounts to extract, based on a set of rules, a plurality of characteristics that is associated with that account and that includes an account identifier from a plurality of account identifiers and an entitlement value from a plurality of entitlement values;

map, based on an entitlement value from the plurality of entitlement values and associated with each account from the plurality of accounts, a first subset of accounts from the plurality of accounts to a first privilege value;

map, based on an entitlement value from the plurality of entitlement values and associated with each account from the plurality of accounts, a second subset of accounts from the plurality of accounts to a second privilege value;

adjust, based on a risk value for at least one of an account from the first subset of accounts or an account from the second subset of accounts, a privilege value for the at least one of the account from the first subset of accounts or the account from the second subset of accounts;

generate a report indicating (1) the first subset of accounts having the first privilege value and the second subset of accounts having the second privilege value and (2) for each computing platform from the one or more computing platforms, a number of non-compliant non-human accounts at that computing platform;

schedule a plurality of jobs for automatic execution of the instruction to retrieve, the instruction to parse, the instruction to map the first subset of accounts, the instruction to map the second subset of accounts, and the instruction to generate, in response to at least one trigger event;

store the plurality of jobs in the database;

query the database to retrieve the plurality of jobs to automatically execute the instruction to retrieve, the instruction to parse, the instruction to map the first subset of accounts, the instruction to map the second subset of accounts, and the instruction to generate, in response to the at least one trigger event;

determine, based on the set of rules, a risk score from a plurality of risk scores for each account from the first subset of accounts; and in response to a percentage of risk scores from the plurality of risk scores exceeding a predetermined threshold, cause a remedial action to occur at an account from the plurality of accounts.

16. The apparatus of claim 15, wherein the one or more computing platforms include a user device, the instructions further cause the processor to present the report on a user interface of the user device.

17. The apparatus of claim 15, wherein the instructions further include instructions to cause the processor to:

query the database to determine a non-scheduled job from a plurality of non-scheduled jobs; and schedule the non-scheduled job for execution by one of single-threading or multi-threading.

18. The apparatus of claim 15, wherein the instructions further include instructions to cause the processor to:

adjust, based on the plurality of risk scores, the first privilege value of each account from the first subset of accounts.

19. The apparatus of claim 15, wherein:

the data associated with each account from the plurality of accounts are previous data;

the plurality of accounts is a first plurality of accounts;

the plurality of characteristics is a first plurality of characteristics;

the instructions further include instructions to cause the processor to:

associate, based on the first plurality of characteristics of each account of the first plurality of accounts, each account from the first plurality of accounts with a privilege value from a plurality of privilege values to produce an association between each account from the first plurality of accounts with a privilege value from the plurality of privilege values;

retrieve updated data associated with a second plurality of accounts from the one or more computing platforms;

compare the updated data with the previous data to determine changes between the first plurality of characteristics of each account from the first plurality of accounts and a second plurality of characteristics of each account from the second plurality of accounts; and update the association to generate an updated association between each account from the second plurality of accounts and a privilege value from the plurality of privilege values.

* * * * *